(12) United States Patent
Sato et al.

(10) Patent No.: US 6,237,954 B1
(45) Date of Patent: May 29, 2001

(54) APPARATUS FOR SUPPORTING A STEERING COLUMN

(75) Inventors: Kenji Sato, Gunma-ken; Isamu Chikuma, Maebashi; Sakae Matsumoto, Takasaki; Kiyoharu Higashino, Gunma-ken, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/362,193

(22) Filed: Jul. 28, 1999

(30) Foreign Application Priority Data

Jul. 30, 1998  (JP) .................................................. 10-215045
Feb. 12, 1999  (JP) .................................................. 11-034191

(51) Int. Cl.[7] ....................................................... B62D 1/99
(52) U.S. Cl. ........................... 280/775; 280/777; 280/779
(58) Field of Search ................................. 280/775, 777, 280/779

(56) References Cited

U.S. PATENT DOCUMENTS

| | | | |
|---|---|---|---|
| 1,520,677 | * 12/1924 | Moyse | 280/775 |
| 3,533,302 | 10/1970 | Hansen | 74/493 |
| 5,052,240 | 10/1991 | Miyoshi et al. | 74/493 |
| 5,114,182 | 5/1992 | Thull et al. | 280/779 |
| 5,531,317 | * 7/1996 | Tomaru | 280/775 |
| 5,669,634 | * 9/1997 | Heinzman et al. | 280/777 |

FOREIGN PATENT DOCUMENTS

| | | |
|---|---|---|
| 3642437 | 3/1988 | (DE) . |
| 0 338 923 | 10/1989 | (EP) . |
| 0 440 898 | 8/1991 | (EP) . |
| 2 740 882 | 5/1997 | (FR) . |
| 2 273 338 | 6/1994 | (GB) . |
| 2 307 730 | 6/1997 | (GB) . |
| 62-30565 | 8/1987 | (JP) . |
| 6-183352 | 7/1994 | (JP) . |

* cited by examiner

*Primary Examiner*—Kenneth R. Rice
(74) *Attorney, Agent, or Firm*—Miles & Stockbridge P..C

(57) ABSTRACT

An apparatus for supporting a steering column has a cross member spanned over two right-and-left walls of a car body at a portion just anterior to a driver's seat, a support bracket integrally fixedly connected to a portion, aligned with the driver's seat, of an intermediate portion of the cross member, a supported bracket fixedly connected to an intermediate portion of the steering column, and a connecting member for connecting the support bracket and the supported bracket to each other with no intermediary of other brackets.

24 Claims, 27 Drawing Sheets

APPARATUS FOR SUPPORTING A STEERING COLUMN

This application claims the benefit of Japanese patent applications Nos. 10–215045 and 11–034191 which are hereby incorporated by reference.

BACKGROUND OF THE INVENTION

1. Field of the Invention

The present invention relates to an improvement of a steering column supporting apparatus for supporting on a car body a steering column constituting a steering device of an automobile, and to a steering column supporting apparatus capable of reducing costs by decreasing the number of parts and the number of assembly processes.

2. Related Background Art

FIGS. 27–29 show one example of an automobile steering apparatus which has hitherto been known. A motion of an unillustrated steering wheel is transmitted to a steering gear which is not likewise illustrated via a steering shaft 36 and an unillustrated universal joint, thereby imparting a steering angle to front wheels. Further, the steering shaft 36 is rotatably supported inside a steering column 6 supported on a car body. This steering column 6 is fixedly supported through a support bracket 38 and a supported bracket 39 on a fixed bracket 37 fixed by welding to a cross member 1 provided on the car body.

The support bracket 38 is fixedly connected to the fixed bracket 37 by use of bolts 40, 40 and nuts 46, 46. The supported bracket 39 is fixedly connected by welding to an intermediate portion of the steering column 6. Then, the supported bracket 39 is fixedly connected to the support bracket 39 by use of a bolt 11 and a nut 12.

Note that the example illustrated therein shows a shock absorbing tilt type steering apparatus given a shock absorbing function of absorbing a shock applied to a body of the driver who has collided with the steering wheel when at a secondary collision, and a function of making adjustable of a height position of the steering wheel. A contrivance of providing the shock absorbing function thereof involves the use of a collapsible steering column 6 of which an entire length is reduced while absorbing an impact energy. In addition, a supported bracket 39 is so supported by a support bracket 38 as to be detachable therefrom when a strong force acting forward (leftward in FIG. 2) is applied.

A front side end (a left side end in FIG. 27) of the steering column 6 is supported on a car body 42 in a rockable manner about shafts 41, 41. To be specific, a rock bracket 44 fixed by welding to the front side end of the steering column is pivotally supported through the horizontal shafts 41, 41 by a lower fixed bracket 43 fixed to the car body 42 with a bolt. Further, the bolt 11 engages with an elongate hole 45 formed in the support bracket 38 and taking a circular arc with the horizontal shaft 41 being centered. Note that a structure of the shock absorbing tilt type steering apparatus, which has hitherto been known, is not related to the gist of the present invention, and hence a detailed description thereof is omitted.

The prior art structure described above requires a large number of parts needed for supporting the steering column on the car body, which inevitably leads to a rise in terms of costs. Namely, the prior art structure requires at least "the fixed bracket 37", "the support bracket 38", "plural pairs of bolts 40, 40 and nuts 46, 46 for connecting the fixed bracket 37 and the support bracket 38 to each other".

It is therefore inevitable that a parts working cost, a parts management cost and an assembly cost rise due to an increase in the number of parts, which might induce a rise in the costs for automobile steering apparatus including a steering column supporting apparatus. Further, it is required that the plural pairs of bolts 40, 40 and nuts 46, 46 for connecting the fixed bracket 37 and the support bracket 38 to each other, be disposed, as obvious from FIG. 28, at a large pitch to some extent in terms of how much a tool for fastening the bolts 40, 40 and the nuts 46, 46 can be handled. Consequently, there arises a necessity for setting width dimensions (right-and-left directional dimensions in FIG. 28) of the fixed bracket 37 and of the support bracket 38 larger than substantially needed, with the result that the steering column supporting apparatus is downsized and reduced in weight with a difficulty.

SUMMARY OF THE INVENTION

The present invention, which provides an apparatus for supporting a steering column was devised under such circumstances.

According to one aspect of the present invention, an apparatus for supporting a steering column comprises a cross member spanned over two right-and-left walls of a car body at a portion just anterior to a driver's seat, a support bracket integrally fixedly connected to a portion, aligned with the driver's seat, of an intermediate portion of the cross member, a supported bracket fixedly connected to an intermediate portion of the steering column, and a connecting member for connecting the support bracket and the supported bracket to each other with no intermediary of other brackets.

More preferably, in addition to the requirement given above, the following requirements (1)–(3) are provided.

(1) The support bracket includes a pair of right-and-left support plate members parallel to each other and is fixedly connected by welding to the cross member. The supported bracket is interposed between the pair of support plate members in a state of being fixed by welding to the steering column. The connecting member is a bolt penetrating the pair of support plate members and the supported bracket. The supported bracket is fixedly supported by the pair of support plate member with a nut screwed to the tip of the bolt and with a head of the bolt.

(2) The supported bracket is supported in an up-and-down position adjustable manner by the support bracket, and the front side end of the steering column is supported in a rockable manner by a rock support member provided at a front side end of the support bracket.

(3) In addition to at least the requirement (1) (further to the two requirements (1) and (2) as the necessity may arise), the supported bracket is so connected to said support bracket as to be shiftable forward when a strong load acting forward is applied to said steering column. The front side end of the steering column is supported by a shock absorbing member provided at the front side end of the support bracket. The shock absorbing member, if the strong load is applied thereto, permits the steering column to shift forward while being plastically deformed.

In the case of the thus constructed apparatus for supporting the steering column according to the present invention, the support bracket is integrally fixed connected to the cross member, it is therefore possible to reduce the number of parts by omitting the "fixed bracket" and the "plural pairs of bolts and nuts for connecting the fixed bracket and the support bracket to each other" which have hitherto been required for the prior art structure described above. As a result, the costs for the automobile steering apparatus including the steering column supporting apparatus can be restrained small by decreasing each of the parts working cost, the parts management cost and the assembly cost. Further, with the plural pairs of bolts and nuts being unnecessary, the width of the support bracket can be set to a dimension necessary for supporting the steering column. Therefore, in combination with the omissions of the "fixed bracket" and the "plural pairs of bolts and nuts for connecting the fixed bracket and the support bracket to each other", the steering column supporting apparatus can be downsized and decreased in weight.

DESCRIPTION OF THE PREFERRED EMBODIMENTS

Figure 1:
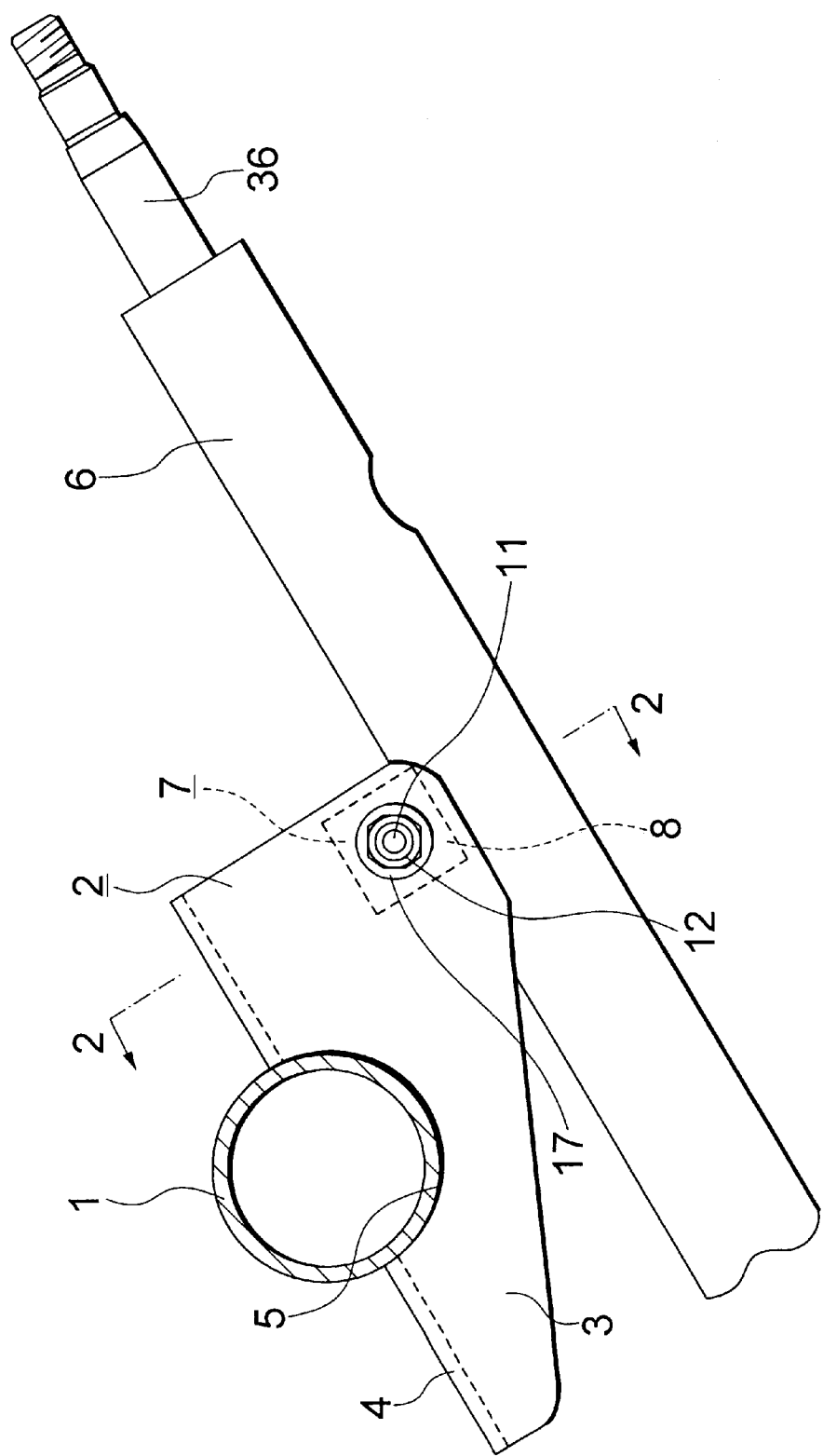
FIG. 1 is a side view showing a first embodiment of the present invention.

An embodiment of an apparatus for supporting a steering column according to the present invention will hereinafter be described with reference to the accompanying drawings.

A support bracket 2 is composed of a metal plate crooked substantially in a U-shape, and includes a pair of right-and-left support plate members 3, 3 parallel to each other, and a connecting plate member 4 for connecting upper side edges of the two support plate members 3, 3 to each other. An upper side edge of the thus constructed support bracket 2 is circularly cut away 5, and a lower half portion of the cross member 1 is tightly fitted in this cut away portion 5. In the support bracket 2, the intermediate lower half portion of the cross member 1 is fitted in the cut away portion 5, and in this state contact portions are welded to each other, thereby fixedly connecting these portions to each other. Note that this welding work is implemented beforehand in a factory of manufacturing the cross member 1 (before assembling the car body).

On the other hand, the supported bracket 7 is fixedly connected by welding to an intermediate portion of the steering column 6. This supported bracket 7 is composed of a metal plate such as a steel plate exhibiting a sufficient rigidity, which is crooked substantially in a C-shape in section (an angled C-shape). The supported bracket 7 includes a pair of right-and-left supported plate members 8, 8 parallel to each other, and a connecting plate member 9 for connecting upper side edges of the two supported plate members 8, 8 to each other. The thus constructed supported bracket 7 has crooked edges 10, 10 provided at lower side edges of the two supported plate members 8, 8, and these crooked edges 10, 10 are abutted upon and welded to an outer peripheral surface of the intermediate portion of the steering column 6, whereby the supported bracket 7 is fixedly connected to the intermediate portion of the steering column 6.

Figure 2:
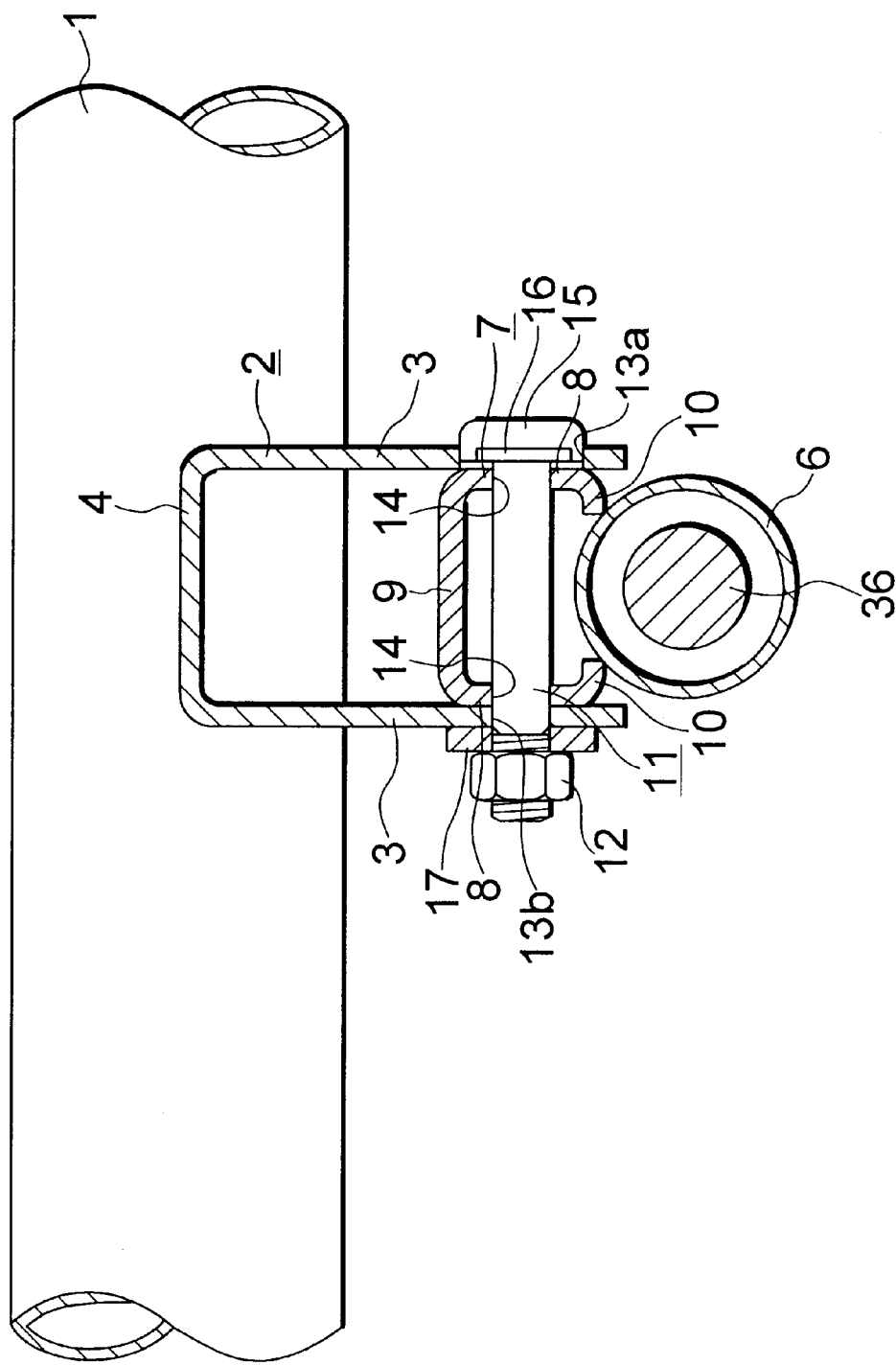
FIG. 2 is a sectional view taken along the line 2—2 in FIG. 5.

The supported bracket 7, which has been thus fixedly connected to the intermediate portion of the steering column 6, is fixedly connected to the support bracket 2 by use of the bolt 11 and the nut 12 as connecting members, the bracket 12 being fixed to the intermediate portion of the cross member 1. To be specific, the bolt 11 is inserted into through-holes 13a, 13b formed in the support plate members 3, 3 of the support bracket 2, and into through-holes 14, 14 formed in the supported plate members 8, 8 of the supported bracket 7, and the nut 12 is screwed to the tip (a left side end in FIG. 2) of the bolt 11. Then, thus nut 12 is fastened, and the pair of support plate members 3 are pressed against outer surfaces of the pair of right-and-left supported plate members 8, 8 constituting the supported bracket 7 with the nut 12 and a head 15 of the bolt 11, whereby the supported bracket 7 is fixedly supported in between the pair of support plate members 3, 3. Note that a pair of flat surfaces 16 parallel to each other are formed in positions, opposite to each other in the diametrical direction, of the outer peripheral surface of the head 15, and the head 15 is non-circularly fitted into the through-hole 13a at the portions formed with the flat surfaces 16 in the embodiment illustrated herein. Accordingly, it never happens that the bolt 11 rotates when the nut 12 is fastened. Further, a washer 17 is interposed between the nut 12 and the support plate member 3.

Figure 27:
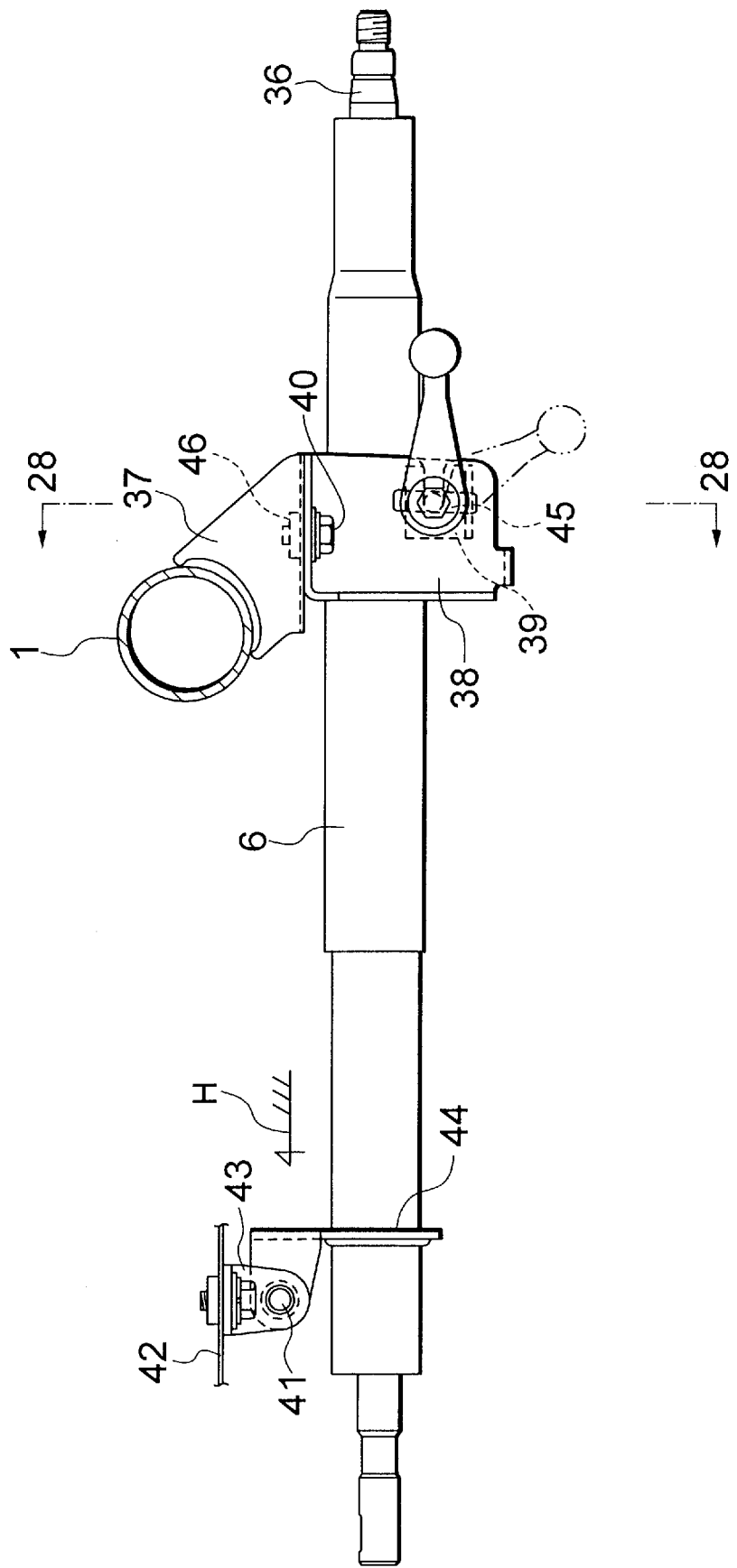
FIG. 27 is a side view showing a first example of a prior art structure.
Figure 28:
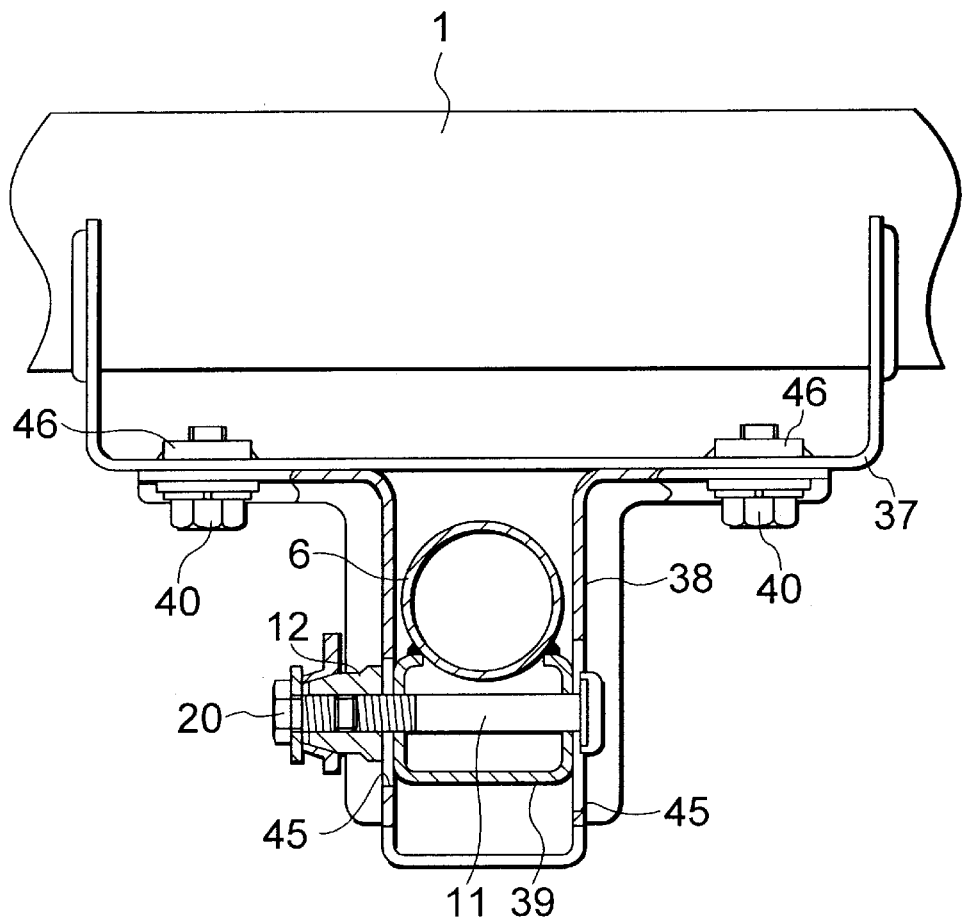
FIG. 28 is a sectional view taken along the line 28—28 in FIG. 27.

In the case of the thus structured apparatus for supporting the steering column according to the present invention, the support bracket 2 is integrally fixedly connected by welding to the cross member 1. It is therefore feasible to reduce the number of parts by omitting "the fixed bracket 37" and "the plural pairs of bolts 40, 40 and nuts 46, 46 for connecting the fixed bracket 37 to the support bracket 38" which are needed for the prior art structure as shown in FIGS. 27 and 28. As a result, the costs for the automobile steering equipment including the steering column supporting apparatus, can be restrained small by reducing each of a parts working cost, a parts management cost and an assembly cost. Further, the steering column supporting apparatus can be downsized and decreased in weight.

Figure 3:
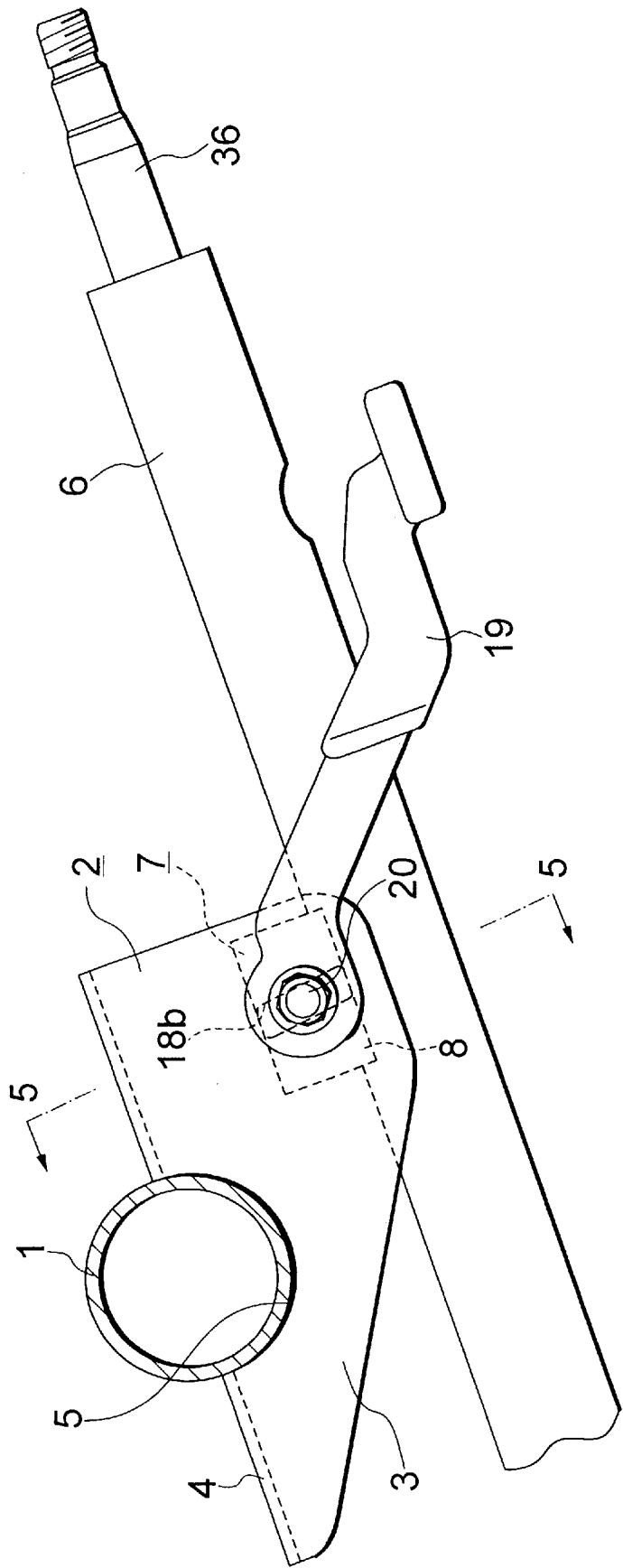
FIG. 3 is a side view showing a second embodiment of the present invention.
Figure 4:
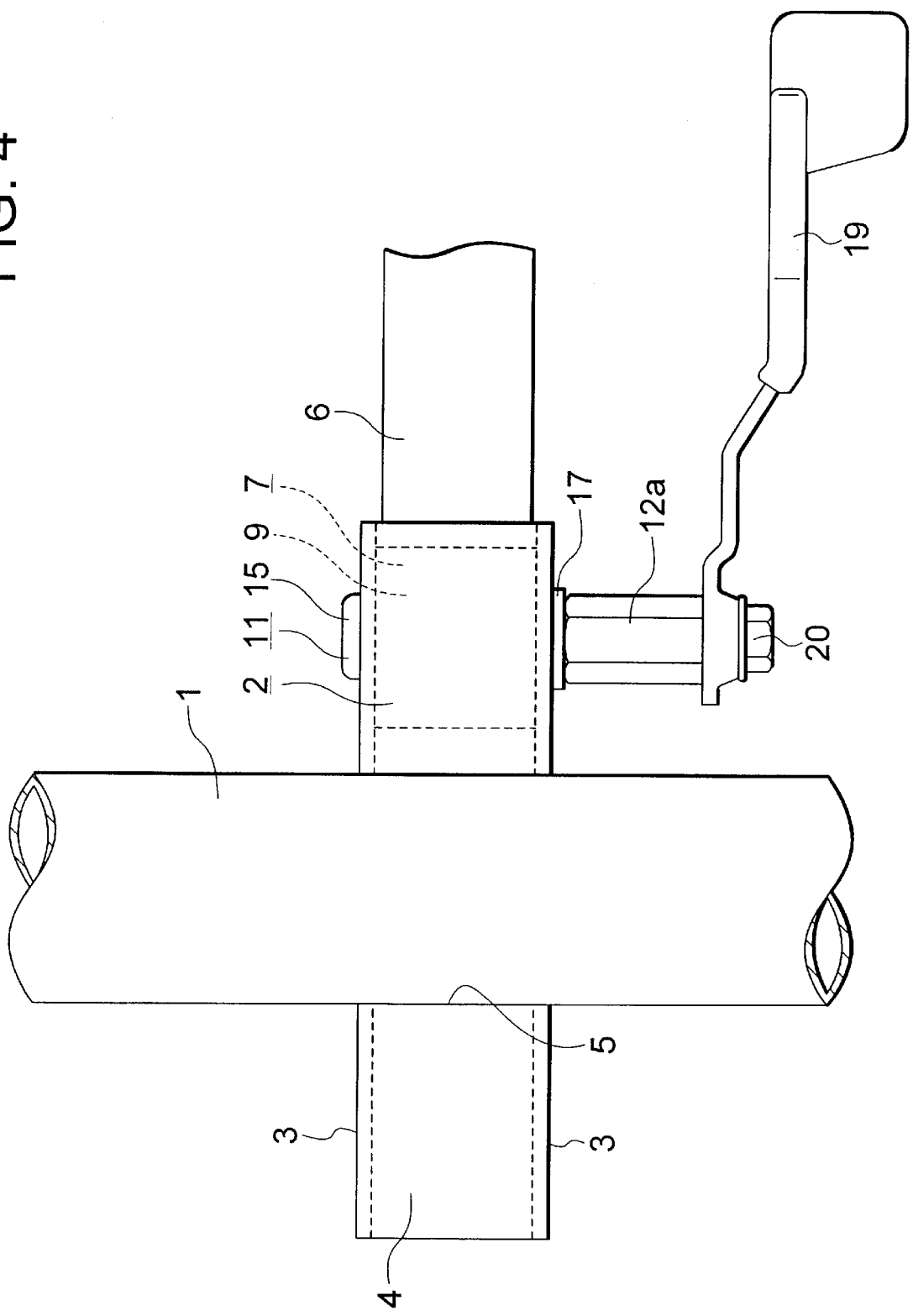
FIG. 4 is a plan view thereof.
Figure 5:
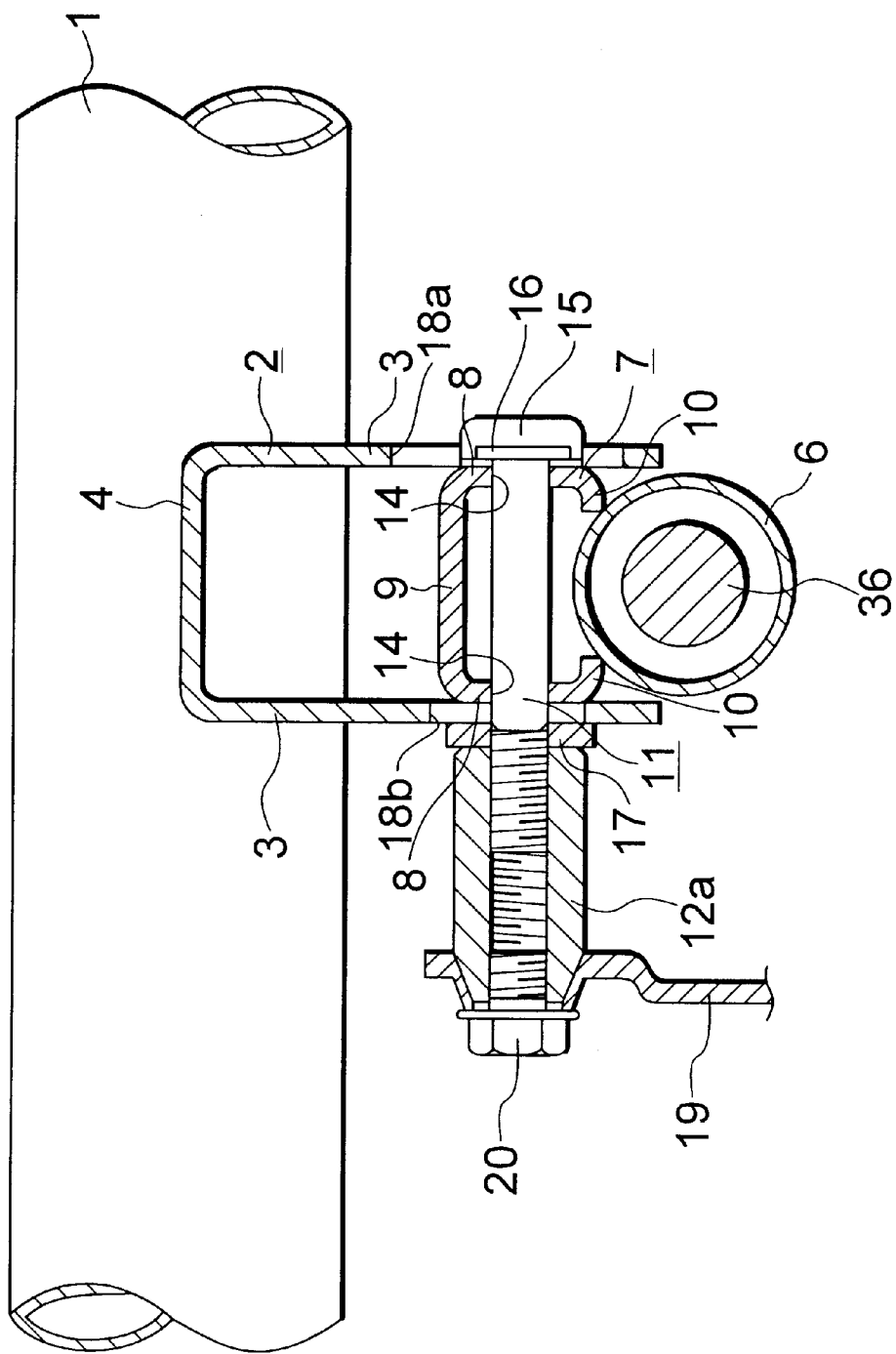
FIG. 5 is a sectional view taken along the line 5—5 in FIG. 3.

Next, FIGS. 3–5 show a second embodiment of the present invention. In the second embodiment, the present invention is applied to a steering column supporting apparatus for constructing a tilt-type steering apparatus capable of adjusting a height position of the steering wheel in accordance with a driving posture and a physique of the driver. For this application, the second example takes such a configuration that elongate holes 18a, 18b each extending in up-and-down directions are formed in mutually-aligned positions in the pair of support plate members 3, 3 constituting the support bracket 2. Then, a contrivance is that the bolt 11 is capable of rising and lowering along the elongate holes 18a, 18b, and, with an engagement of the pair of flat surfaces 16a formed on the head 15 of the bolt 11 with a side edge of the elongate hole 18a, a rotation of the bolt 11 is prevented (the rotation about a central axis of the bolt 11 itself is prevented). Further, a proximal end of a tilt lever 19 is fixedly connected by use of a screw 20 screwed into a nut 12a to the tip (corresponding to a lower side end in FIG. 4 but a left side end in FIG. 5) of the nut 12a of which a proximal end (corresponding to an upper side end in FIG. 4 but a right side end in FIG. 5) is screwed to the tip of the bolt 11.

In the thus configured second embodiment, when adjusting the height position of the steering wheel, a spacing between the nut 12 and the head 15 is expanded by operating the tilt lever 19 in a predetermined direction. In this state, a frictional force between the inner surfaces of the support plate members 3, 3 and the outer surfaces of the supported plate members 8, 8 constituting the supported bracket 7, is reduced or lost. Such being the case, as kept in this state, if the unillustrated steering wheel is moved in the up-and-down directions, the steering column 6 is raised and lowered. In a state where the height position of the steering wheel is shifted to a desired position, the spacing between the nut 12a and the head 15 is narrowed by manipulating the tilt lever 19 in a reverse direction, with the result that there increases the frictional force between the inner surfaces of the support plate members 3, 3 and the outer surfaces of the supported plate members 8, 8 constituting the supported bracket 7. Then, the height position of the steering wheel is fixed in a position after being controlled.

It is to be noted that if the elongate holes formed in the support plate members 3, 3 extend in the axial direction of the steering column 6, not the height position but a front-and-rear position of the steering wheel can be set adjustable. Moreover, the elongate holes 18a, 18b extending in the up-and-down directions can be formed in the support plate members 3, 3, and elongate holes extending in the back-and-forth directions can be formed in the supported plate members 8, 8 of the supported bracket 7 (the positions for forming the respective elongate holes may be reversed), whereby the height position and the front-and-rear positions of the steering wheel can also be set adjustable. In the case of setting the front-and-rear positions adjustable, as a matter of course, the steering column and, in addition, the steering shaft 36 supported inside the steering column 6 are so constructed as to be shiftable (including a collapsible structure) in the back-and-forth directions.

Other configurations and operations are the same as those in the first embodiment discussed above, and hence the repetitive explanations thereof are omitted with the same components being marked with the like numerals.

Figure 6:
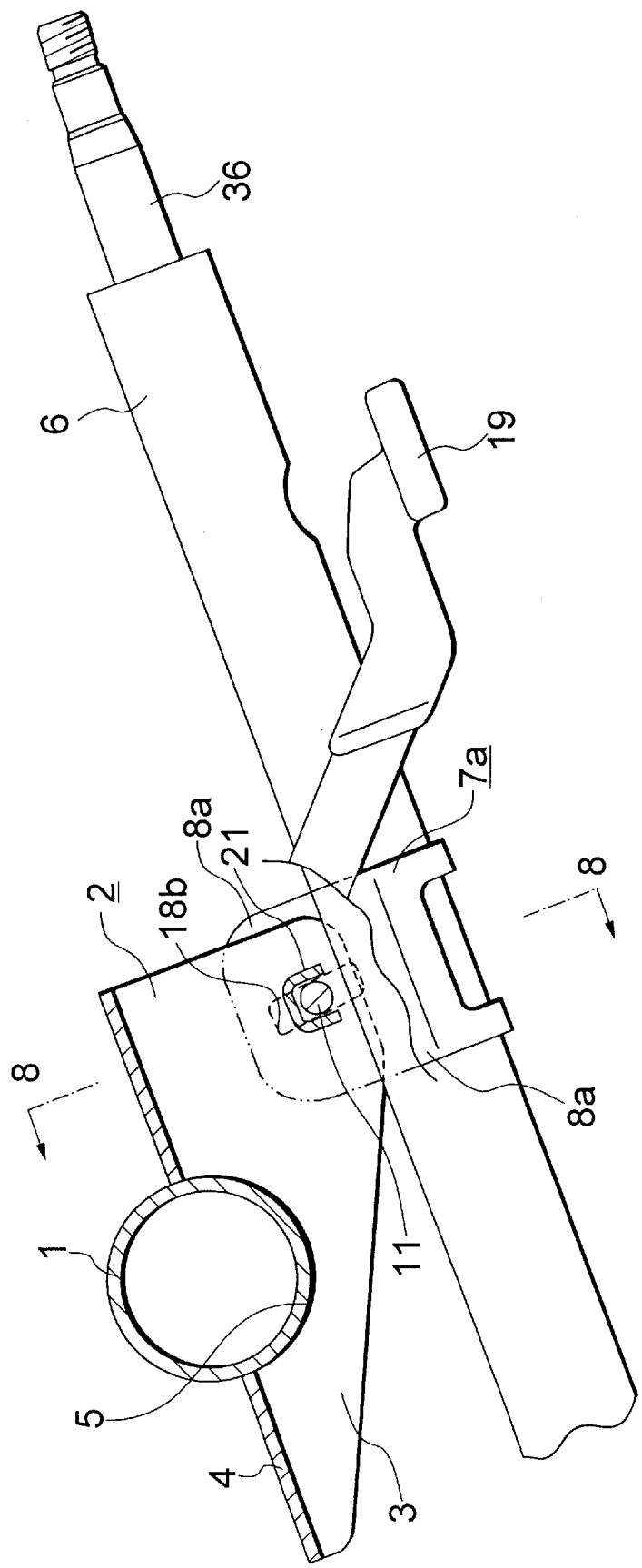
FIG. 6 is a fragmentary vertical sectional side view showing a third embodiment of the present invention.
Figure 7:
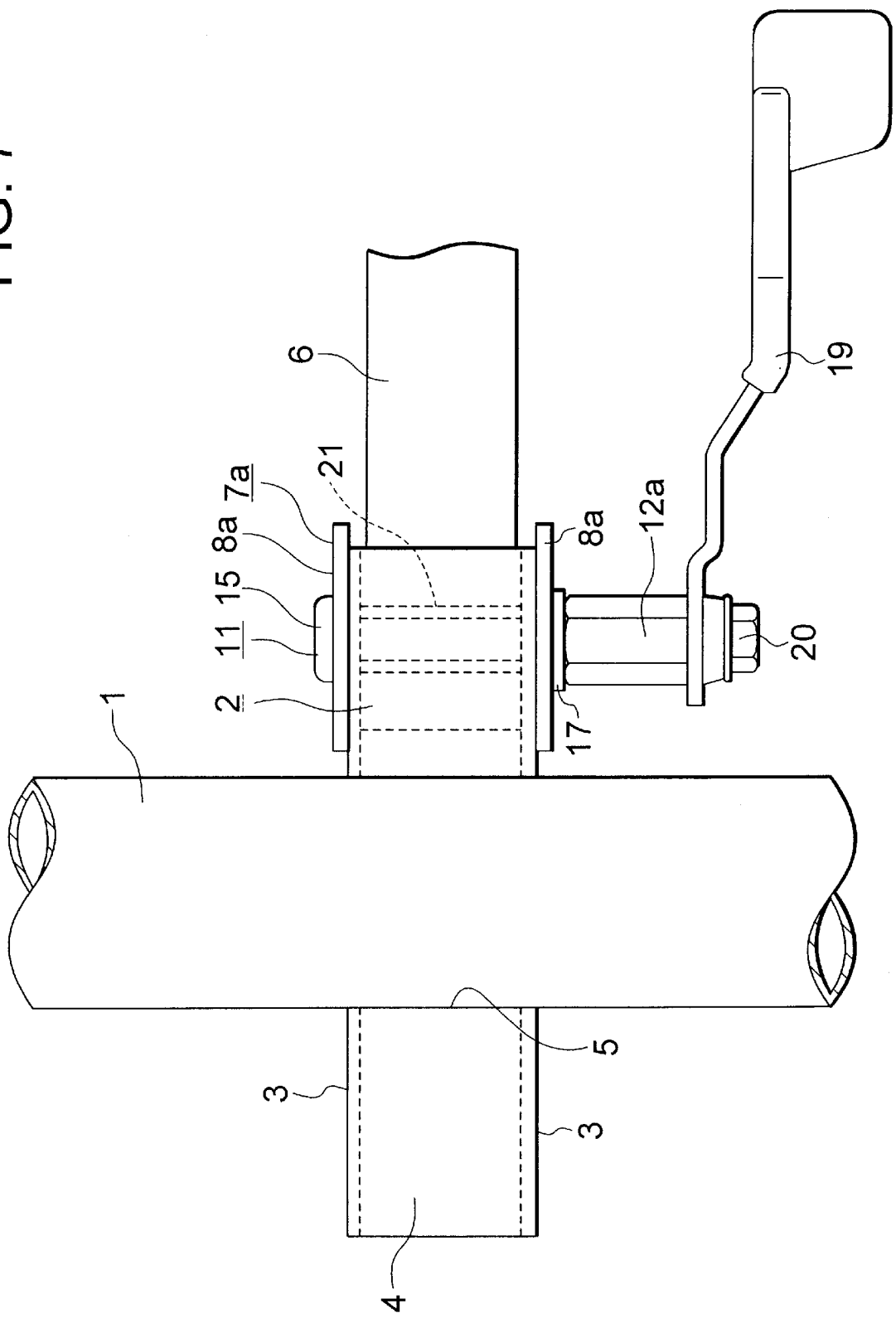
FIG. 7 is a plan view thereof.
Figure 8:
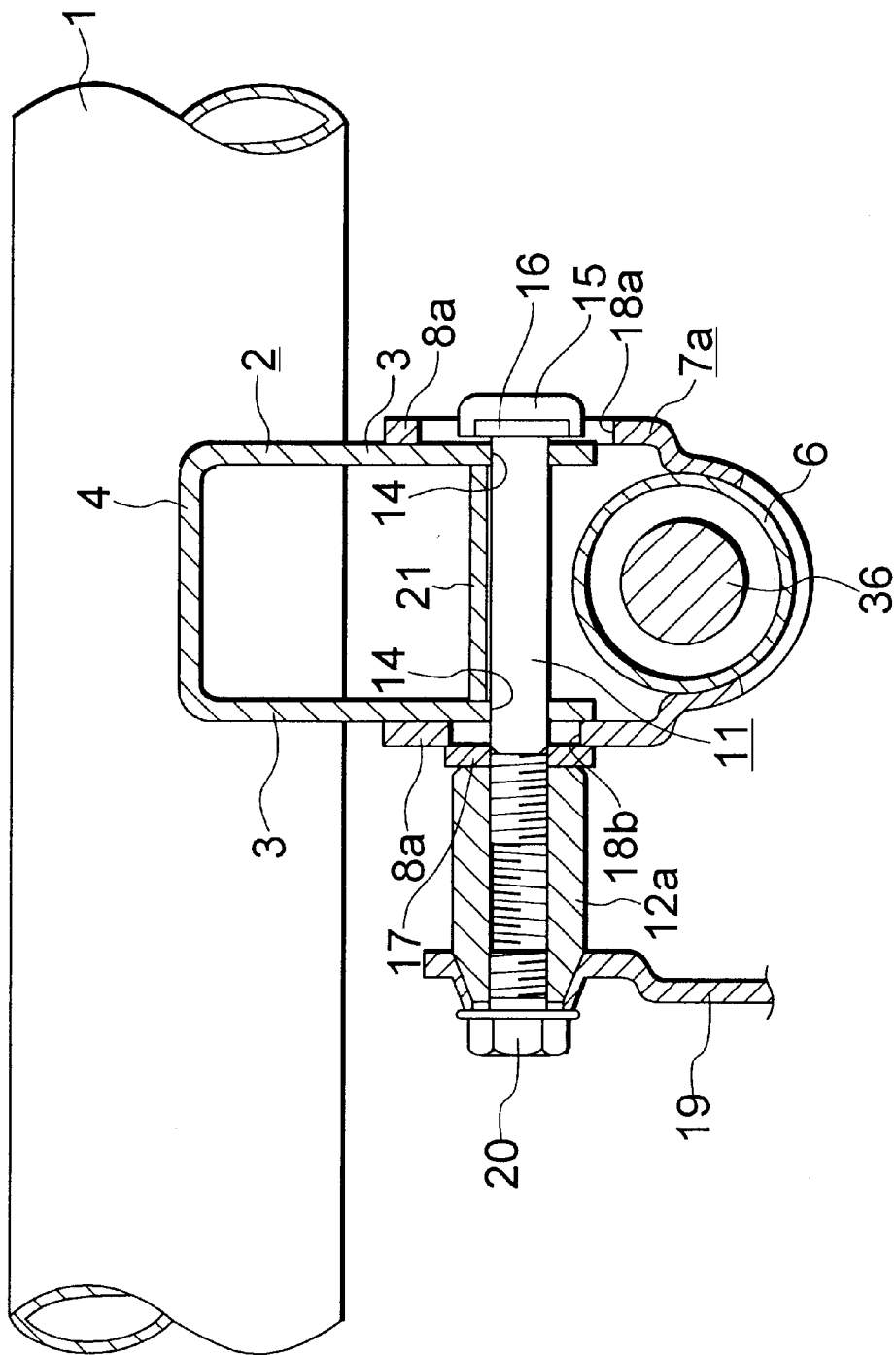
FIG. 8 is a sectional view taken along the line 8—8 in FIG. 6.

Next, FIGS. 6 to 8 show a third embodiment of the present invention. In the third embodiment also, as in the case of the second embodiment discussed above, the present invention is applied to the steering column supporting apparatus for constituting the tilt type steering apparatus. Particularly in the case of the third embodiment, a supported bracket 7a taking substantially a U-shape is fixedly welded to a lower surface of the intermediate portion of the steering column 6. Then, a pair of right-and-left supported plate members 8a, 8a protruded upwards of the steering column 6, hold the pair of right-and-left support plate members 3, 3 constituting the support bracket 2 from both of the right and left sides.

Thus, with a reversed geometry of the supported plate members 8a, 8a and the support plate members 3, 3, the elongate holes 18a, 18b extending in the up-and-down directions are formed on the supported plate members 8a, 8a, while the support plate members 3, 3 are formed with through-holes 14, 14 through which the bolt 11 can merely be inserted. Further, a bridging bracket 21 taking substantially a U-shape in section is provided between peripheral portions of the through-holes 14, 14 inwardly of the inner surfaces of the pair of support plate members 3, 3. The bridging bracket 21, when reducing the spacing between a nut 12a and the head 15 of the bolt 11 by manipulating the tilt lever 19, performs a function of preventing the spacing between the pair of supported plate members 8a, 8a from being narrowed and sufficiently enhancing a contact pressure between the outer surfaces of the support plate members 3, 3 and the inner surfaces of the supported plate members 8a, 8a.

Other configurations and operations are the same as those in the first and second examples discussed above, and hence the repetitive explanations thereof are omitted with the same components being marked with the like numerals.

Figure 9:
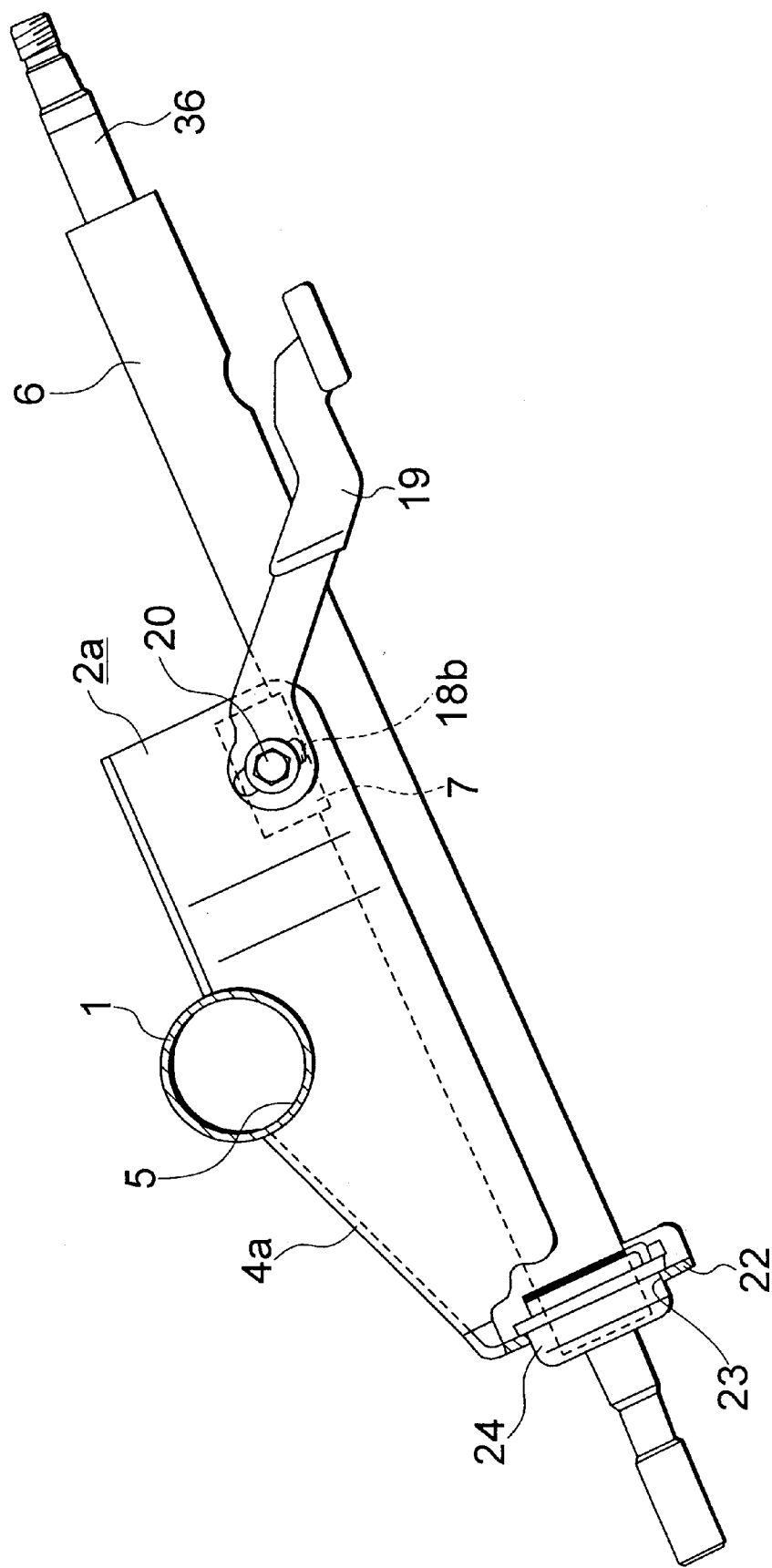
FIG. 9 is a fragmentary vertical sectional side view showing a fourth embodiment of the present invention.
Figure 10:
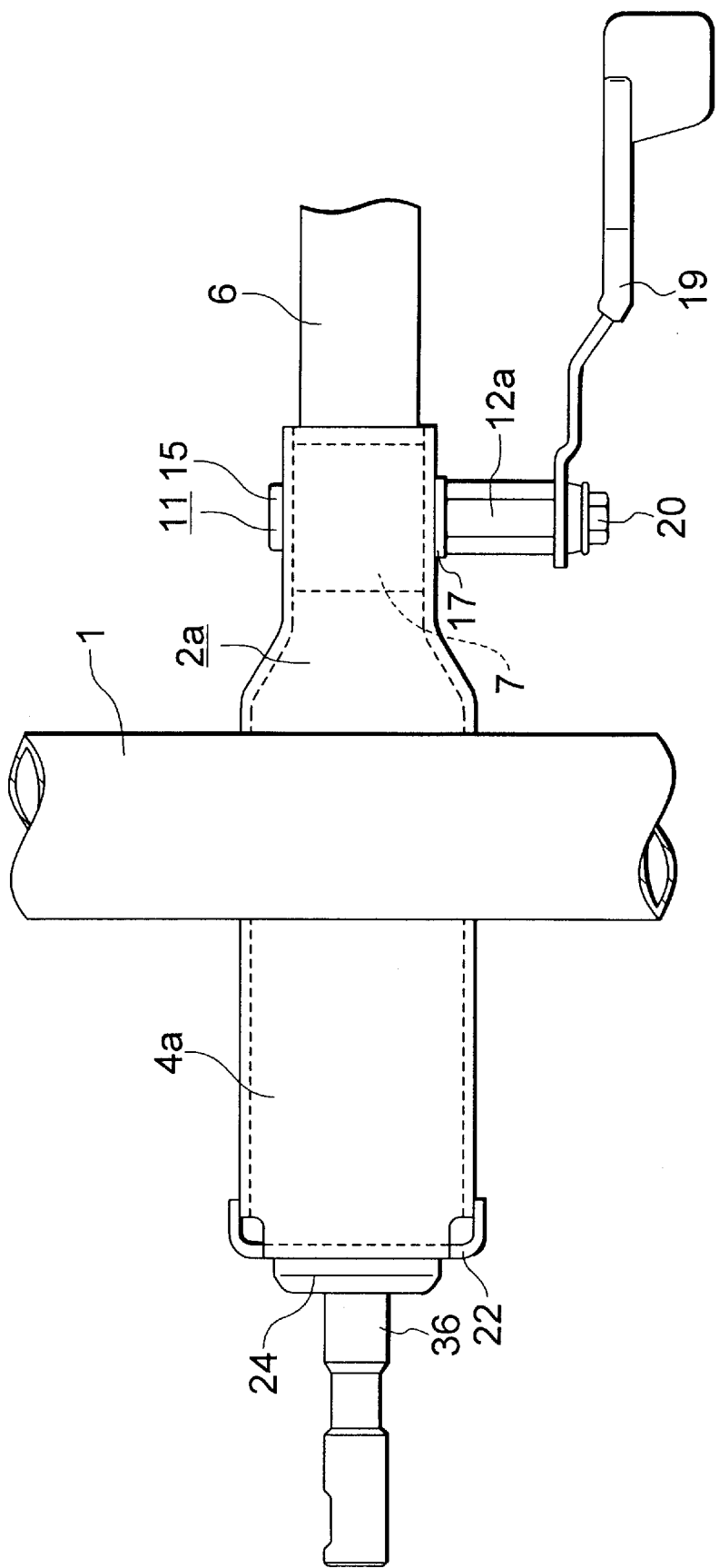
FIG. 10 is a plan view thereof.

Next, FIGS. 9 and 10 show a fourth embodiment of the present invention. In the fourth embodiment, as in the second and third embodiments described above, in order to apply the present invention to the steering column supporting apparatus for constituting the tilt type steering apparatus, the supported bracket 7 is supported by a support bracket 2a so that the up-and-down positions thereof are set adjustable. The structure and operation of the mechanism for making the up-and-down positions adjustable are the same as those in the second embodiment discussed above, and hence the repetitive explanations thereof are omitted with the same components being marked with the like numerals.

Especially in the case of the fourth embodiment, the front side end of the support bracket 2a is provided with an overhanging plate member 22 bent downward from a front edge of a connecting plate member 4a forming the support bracket 2a, which serves as a rock support member for supporting the front side end of the steering column 6 in a rockable manner. Then, an annular bush 24 fixedly externally fitted to the front side end of the steering column 6 is held inside a support hole 23 formed in the overhanging plate member 22. When the supported bracket 7 is ascended and descended in order to adjust the height position of the steering wheel, the overhanging plate member 22 makes a rocking movement based on an elastic deformation of said overhanging plate member 22 with respect to the connecting plate member 4a.

In the case of the structured in the fourth embodiment explained above, the function of the bracket for supporting rockably the front side end of the steering column 6, is given to the support bracket 2a, and it is therefore feasible to reduce the cost for the automobile steering apparatus including the steering column supporting apparatus by further decreasing the number of parts when constructing the tilt type steering apparatus. Other configurations and operations are the same as those in the example 2 described above.

Figure 11:
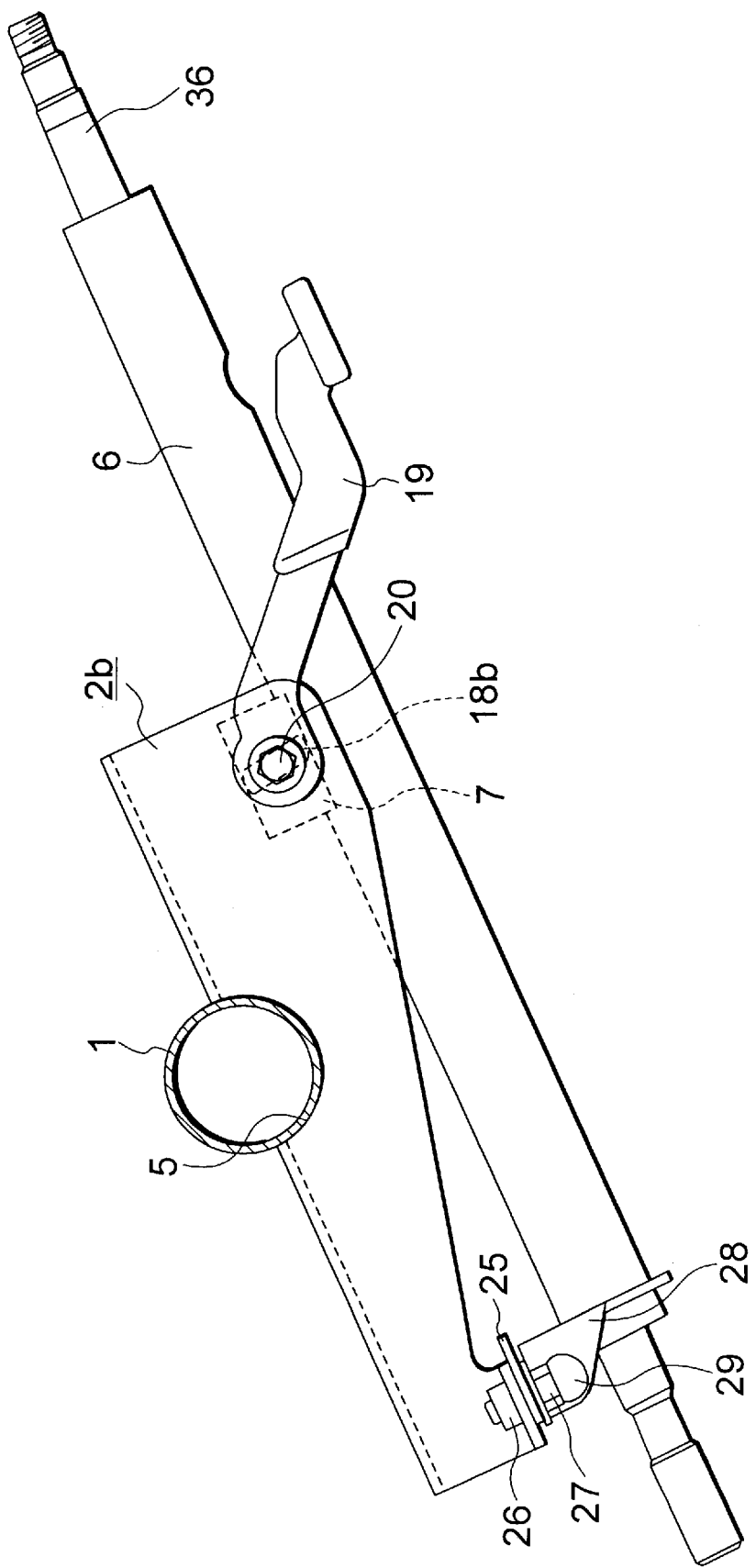
FIG. 11 is a side view showing a fifth embodiment of the present invention.
Figure 12:
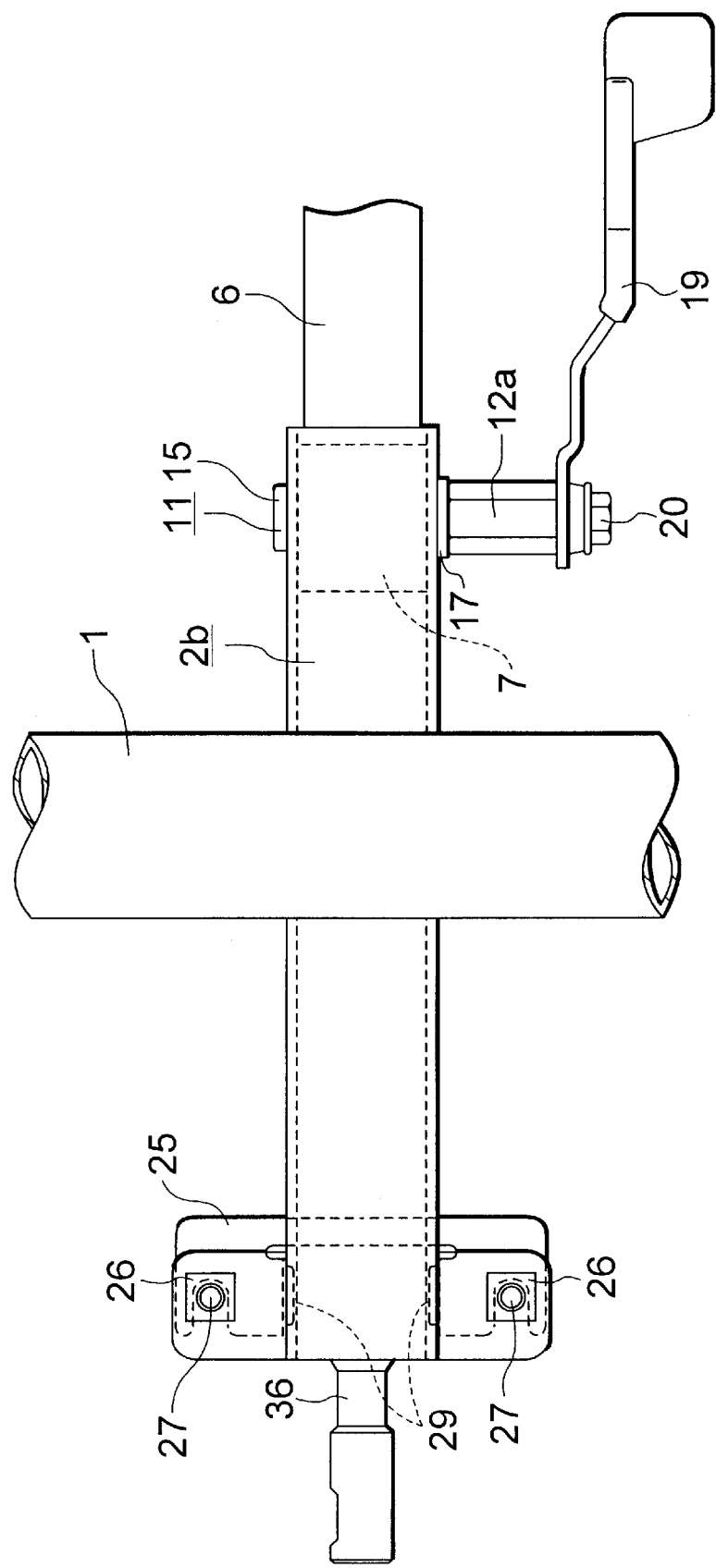
FIG. 12 is a plan view thereof.

Next, FIGS. 11–12 show a fifth embodiment of the present invention. A contrivance in the fifth embodiment is that a support bracket 25 is fixedly connected to the front side end of the support bracket 2b by using nuts 26, 26 welded and fixed to the front side end of the support bracket 2b and screws 27, 27. Further, a supported bracket 28 constituting a rock supporting portion in combination with the support bracket 25, is also fixed likewise by welding to the front side end of the steering column 6. The supported bracket 28 is pivotally supported in a rockable manner by the support bracket 25 through a pair of right-and-left pivots 29, 29. Other configurations and operations are the same as those in the fourth embodiment described above.

Figure 13:
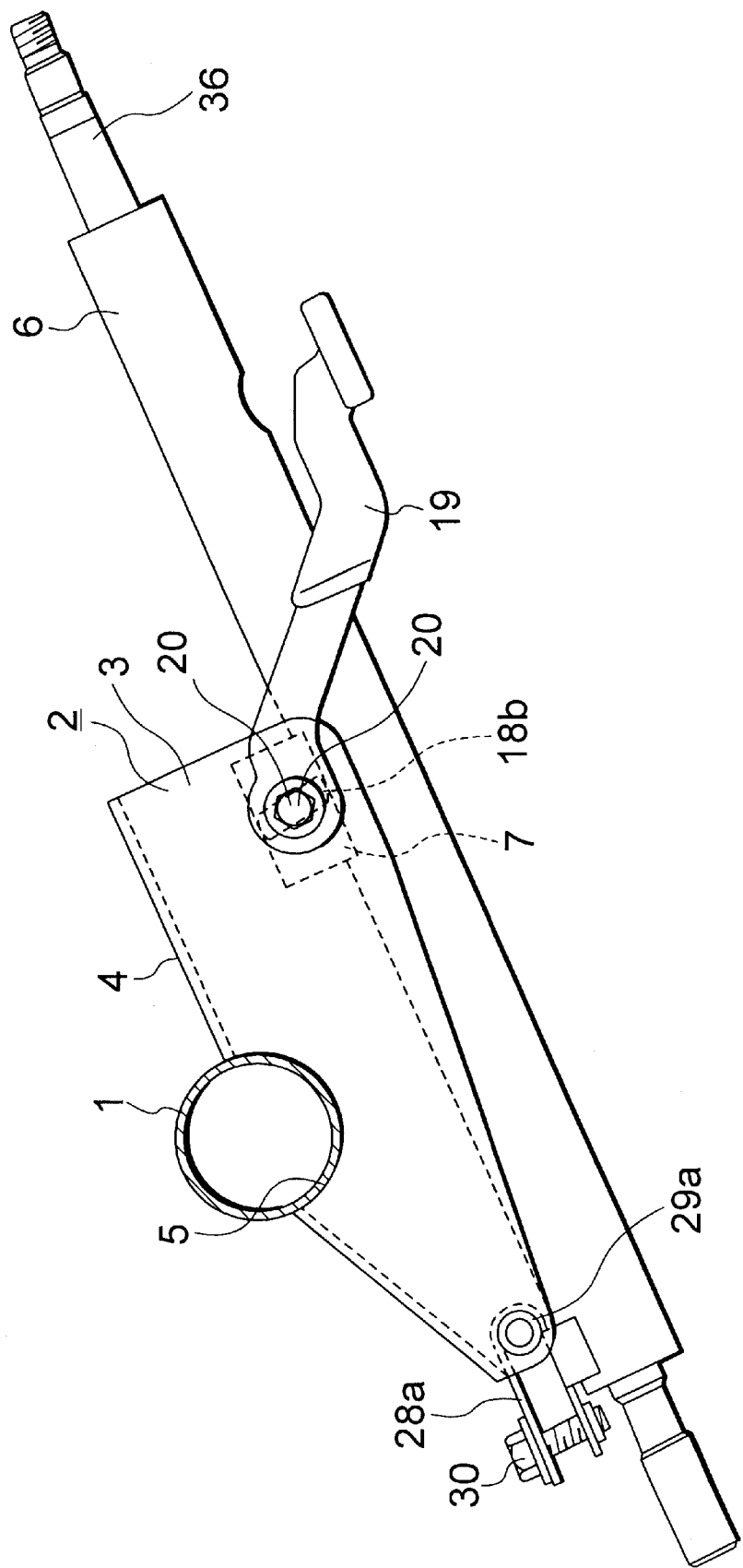
FIG. 13 is a side view showing a sixth embodiment of the present invention.

Next, FIG. 13 illustrates a sixth embodiment of the present invention. In the sixth embodiment, a U-shaped supported bracket 28a with its front being opened is fixed by welding to an upper surface of the front side end of the steering column 6. Further, a pipe-like pivot 29a is fixedly supported between the front side ends of the pair of right-and-left support plate members 3, 3 constituting the support bracket so as to span over the pair of support plate members 3, 3. The front side end of the steering column 6 is pivotally supported in the rockable manner by the front side end of the support bracket 2, which involves closing an opening of the pivotal supported bracket 28a with a screw 30 in a state where the pivot 29a is thrust into the pivotal supported bracket 28a. In this state, the front side end of the steering column 6 is pivotally supported in the rockable manner by the front side end of the support bracket 2. Moreover, the pivot 29a is shiftable in the axial direction of the steering column 6 within the supported bracket 28a, whereby a dimensional error of each member can be absorbed. Note that a screw hole, into which the tip of the screw 30 is screwed, is formed by tapping in an inner peripheral surface of a burring hole formed in one side end of the supported bracket 28a. Other configurations and operations are the same as those in the examples 4 and 5 described above.

Figure 14:
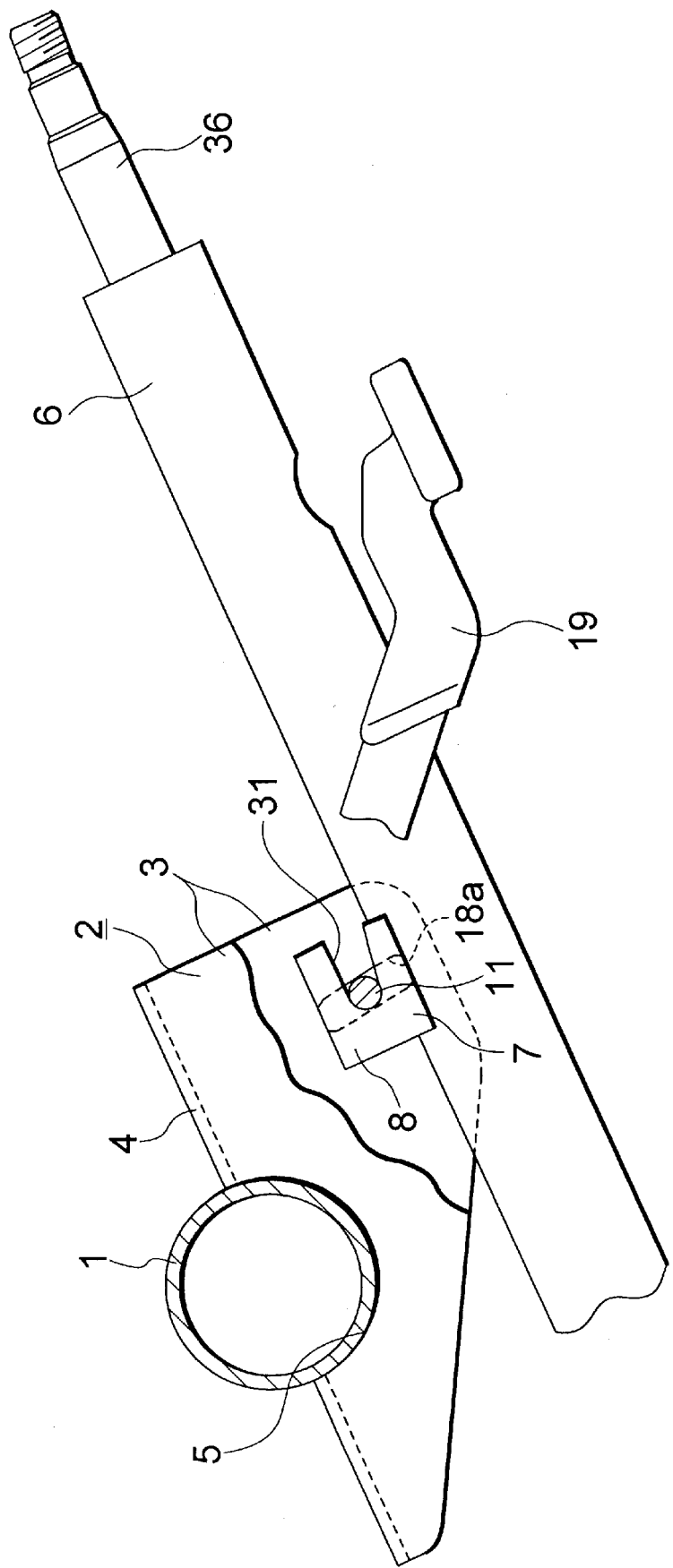
FIG. 14 is a fragmentary vertical sectional side view showing a seventh embodiment when in a normal state.
Figure 15:
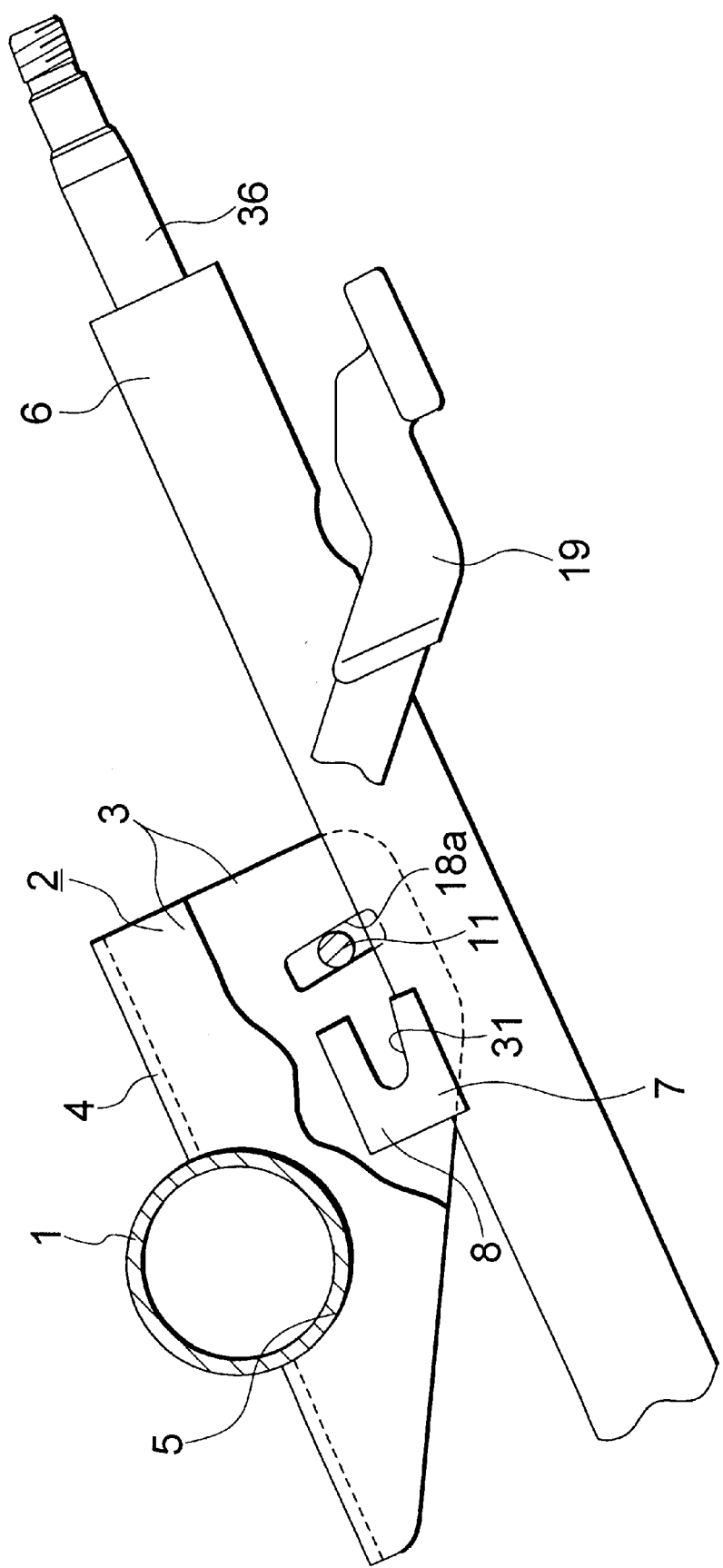
FIG. 15 is a fragmentary vertical sectional side view showing the seventh embodiment in a state where a secondary collision happens.

Subsequently, FIGS. 14 and 15 illustrate a seventh embodiment of the present invention. In the seventh embodiment, the supported bracket 7 fixed by welding to the intermediate portion of the steering column 6, is so connected to the support bracket 2 as to be shiftable forward when a strong load acting forward is applied to the steering column 6. For attaining this configuration in the seventh embodiment, the cut-away portions 31 opened on the rear edge sides of the supported plate members 8, 8 are formed in mutually-aligned positions of the pair of right-and-left supported plate members 8, 8 constituting the supported bracket 7. The bolt 11 for connecting the supported bracket 7 to the support bracket 2 is inserted into each of the cut-away portions 31.

In the seventh embodiment having the above construction, as illustrated in FIG. 14, at a normal time the bolt 11 exists deep in the cut-away portion 31. By contrast, if a secondary collision subsequent to an accident of collision happens wherein the body of the driver impinges on the steering wheel with the result that a strong impact load acting forward is applied to the steering column 6, as shown in FIG. 15, the bolt 11 comes out of each of the cut-away portions 31 enough to allow the steering column 6 to shift forward. Then, this prevents a large impact from being exerted upon the body of the driver who has just impinged upon the steering wheel. Other configurations and operations are the same as those in the embodiment 2 illustrated in FIGS. 4–5.

Next, FIGS, 16–19 show an eighth embodiment of the present invention. A contrivance in the eighth embodiment is that the front side end of the steering column 6 is supported by a shock absorbing member 32 provided at the front side end of the support bracket 2. Then, this shock absorbing member 32, if the strong impact load acting forward subsequently to the secondary collision is applied to the steering column 6, is given a shock absorbing function of permitting the steering column 6 to shift forward while being plastically deformed.

The shock absorbing member 32 is, for incorporating this shock absorbing function, configured such that a band-like portion extending forward from the front edge of the connecting plate member 4 constituting the support bracket 2, is folded in a U-shape. On the other hand, a pin 34 is supported through a bracket 33 upwardly of the front side end of the steering column 6. This bracket 33 combined with the pin 34 and the shock absorbing member constitutes the rock support member. Then, the pin 34 is positioned inside the folded portion 35 of the shock absorbing member 32, and functions as a pivot serving as the center of rock movement of the tilt type steering apparatus at the normal time.

Figure 17:
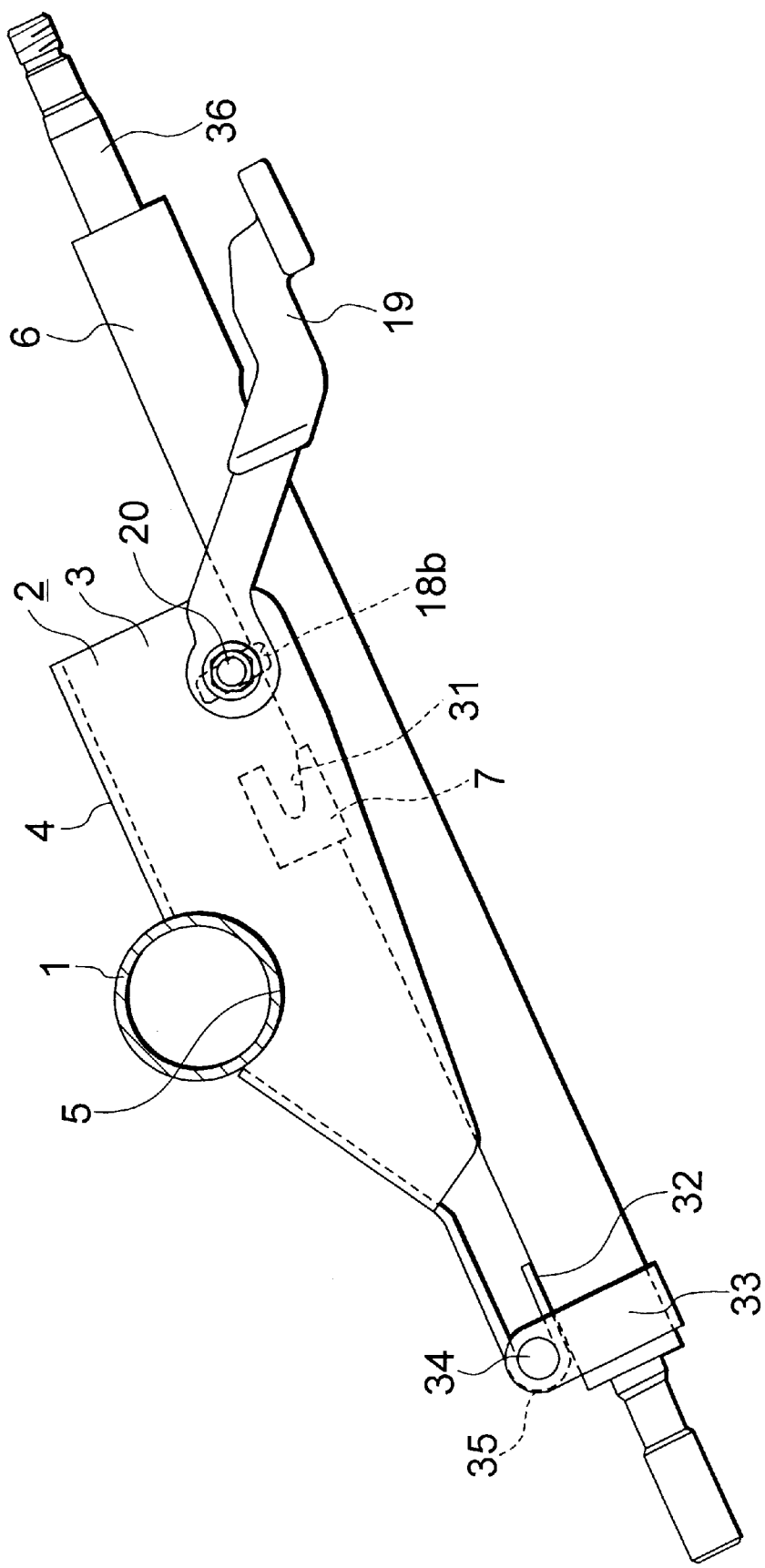
FIG. 17 is a fragmentary vertical sectional side view showing the eighth embodiment in the state where the secondary collision happens.

If the secondary collision subsequent to the accident of collision happens wherein the body of the driver impinges on the steering wheel with the result that the strong impact load acting forward is applied to the steering column 6, as shown in FIG. 17, the bolt 11 supporting the supported bracket 7 on the support bracket 2 comes out of each of the cut-away portions 31 enough to allow the steering column 6 to shift forward. Simultaneously, the folded portion 35 of the shock absorbing member 32 is withdrawn by the pin 34, whereby the folded portion 35 moves toward the front edge of the shock absorbing portion. On this occasion, the shock absorbing member 32 is plastically deformed, and thus absorbs an impact energy applied to the steering column from the body of the driver. Then, this prevents more effectively the large impact from being exerted upon the body of the driver who has impinged upon the steering wheel. Other configurations and operations are the same as those in the seventh example illustrated in FIGS. 14 and 15.

Figure 16:
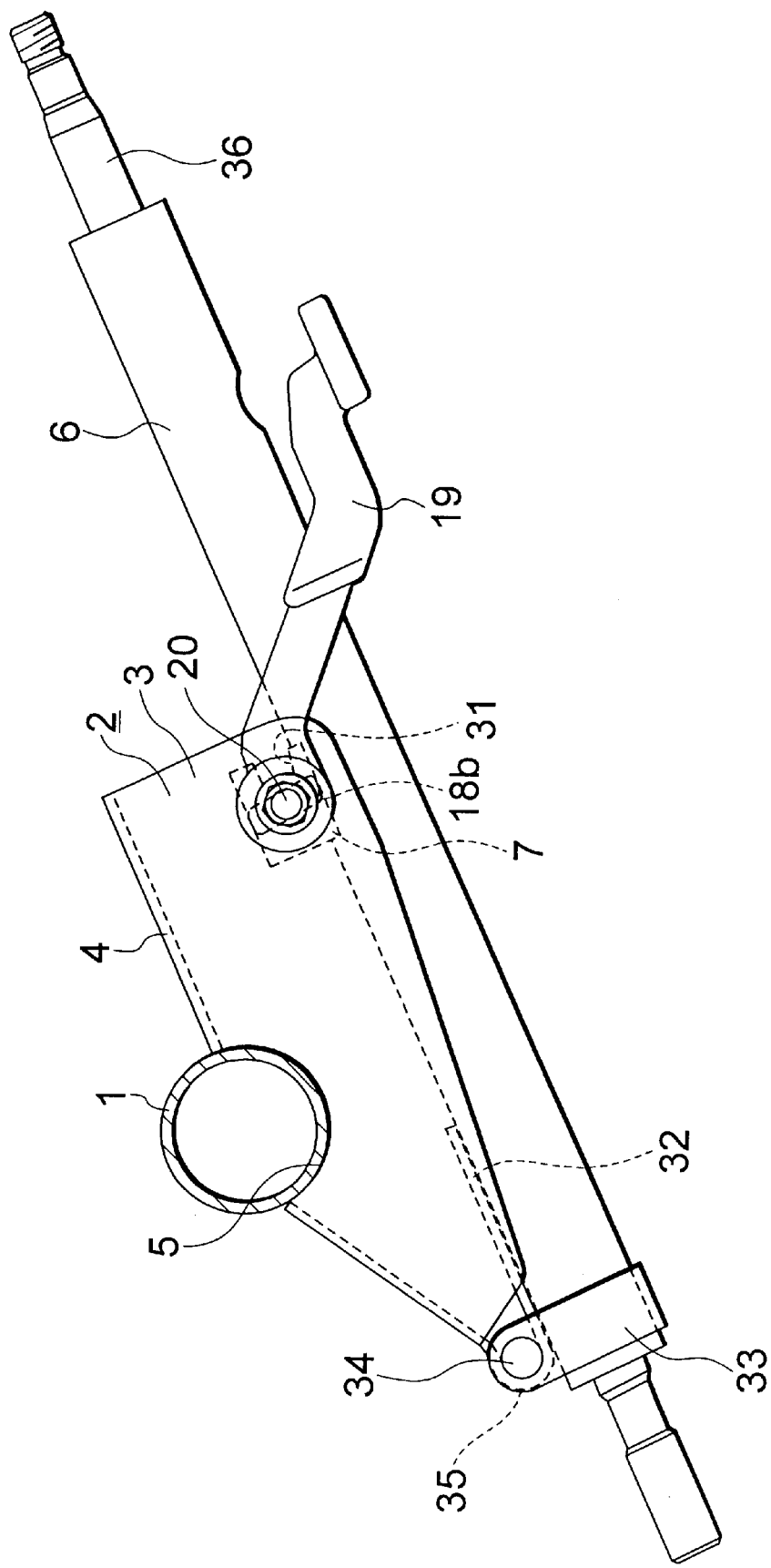
FIG. 16 is a fragmentary vertical sectional side view showing an eighth embodiment of the present invention when in the normal state.
Figure 18:
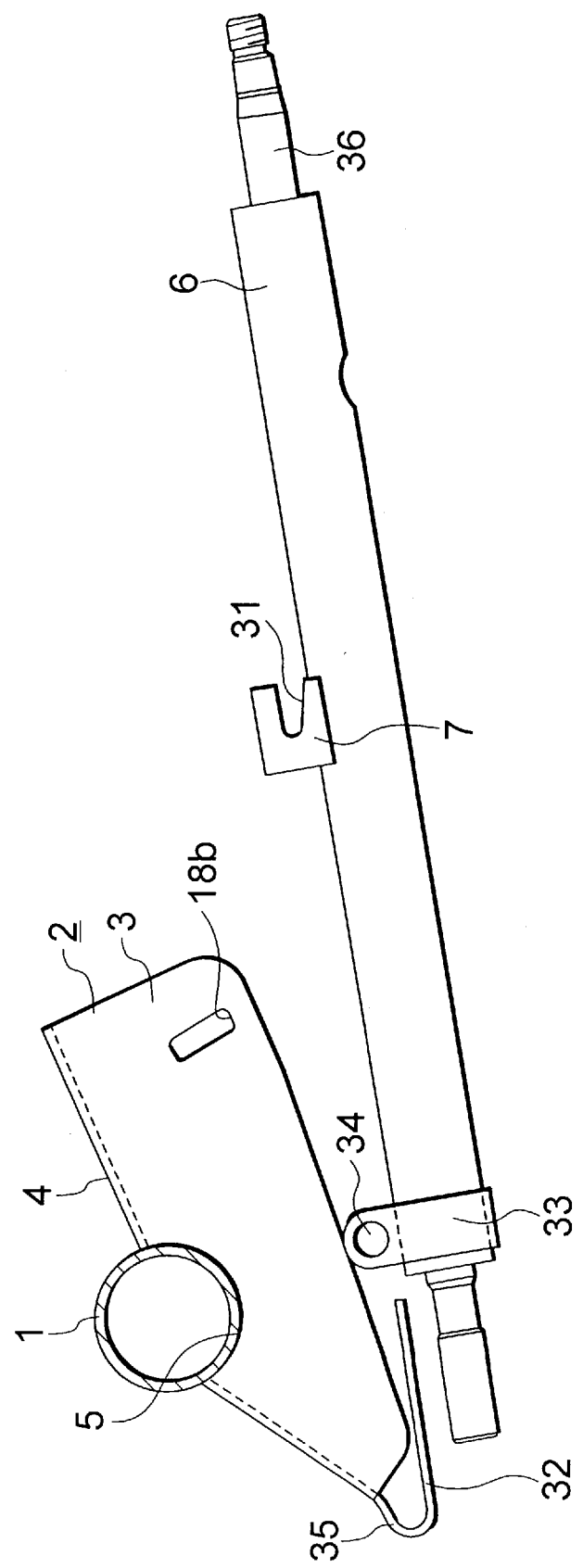
FIG. 18 is a side view showing an initial stage of an assembly work.
Figure 19:
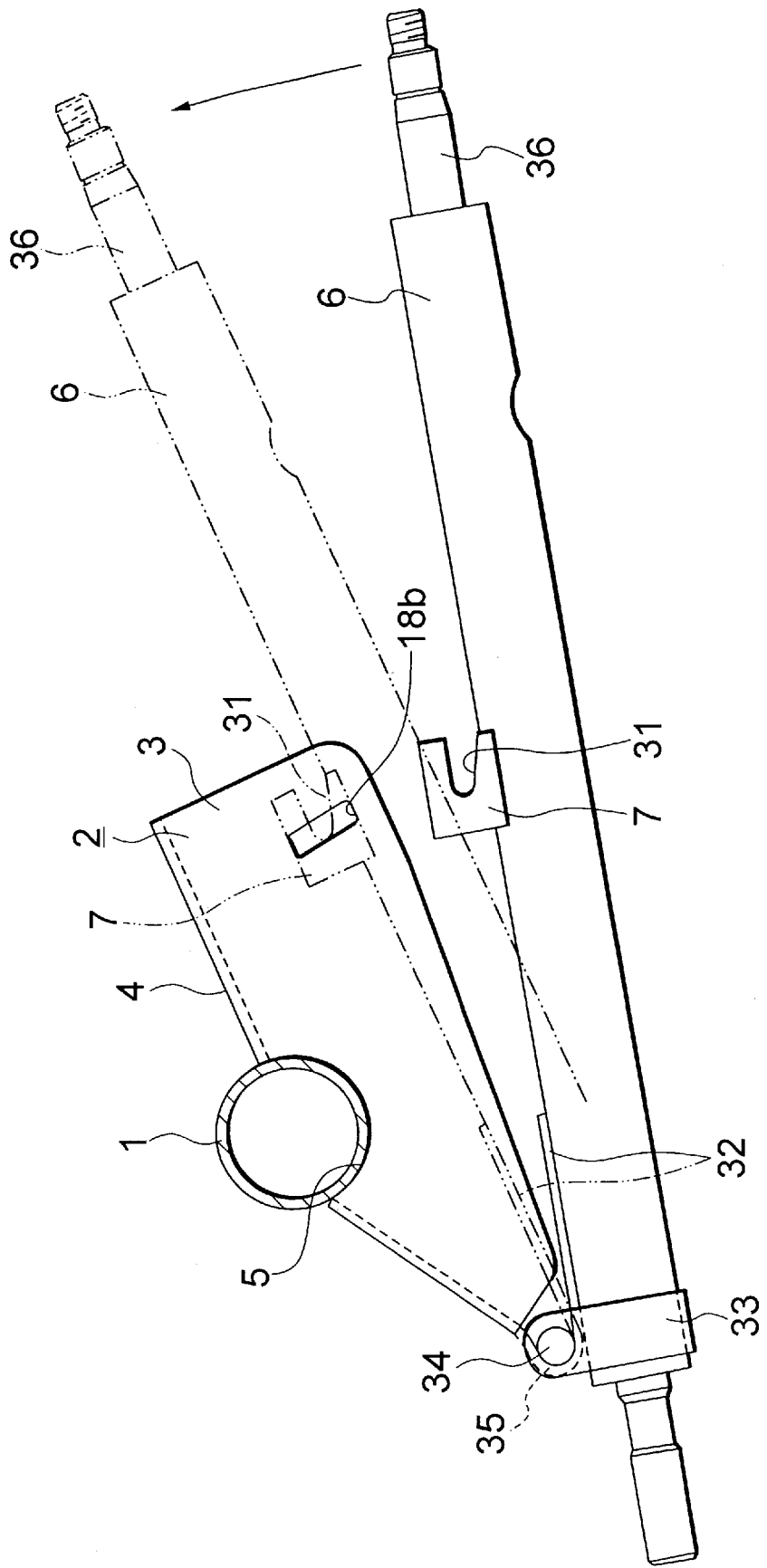
FIG. 19 is a side view showing a final stage thereof.

Note that an assembly work of the structure in the eighth embodiment can be easily performed. That is, in a factory for working the cross member 1, the front side end of the shock absorbing member 32 is protruded downward as illustrated in FIG. 18 in a state where the support bracket 2 is assemble to the cross member 1. Then, the front side end of the shock absorbing member 32 is inserted into a gap between the pin 34 and the upper surface of the front side end of the steering column 6 in the car assembly factory. On the occasion of this inserting work, the steering column 6 is set more lateral (horizontal) than in a state of completion of the assembly. Then, when the front side end of the shock absorbing member 32 is inserted up to a position indicated by the solid line in FIG. 19, the rear portion of the steering column 6 is raised as shown by the chain dotted line in FIG. 19, and a tilt angle of the steering column 6 is set in a state of completion of the assembly. On this occasion, the shock absorbing member 32 is pressed by the upper surface of the front side end of the steering column 6 and thereby plastically deformed, thus coming into the state of completion of the assembly shown in FIG. 16. The assembly work of the structure in the eighth embodiment can be easily performed in this way.

Figure 20:
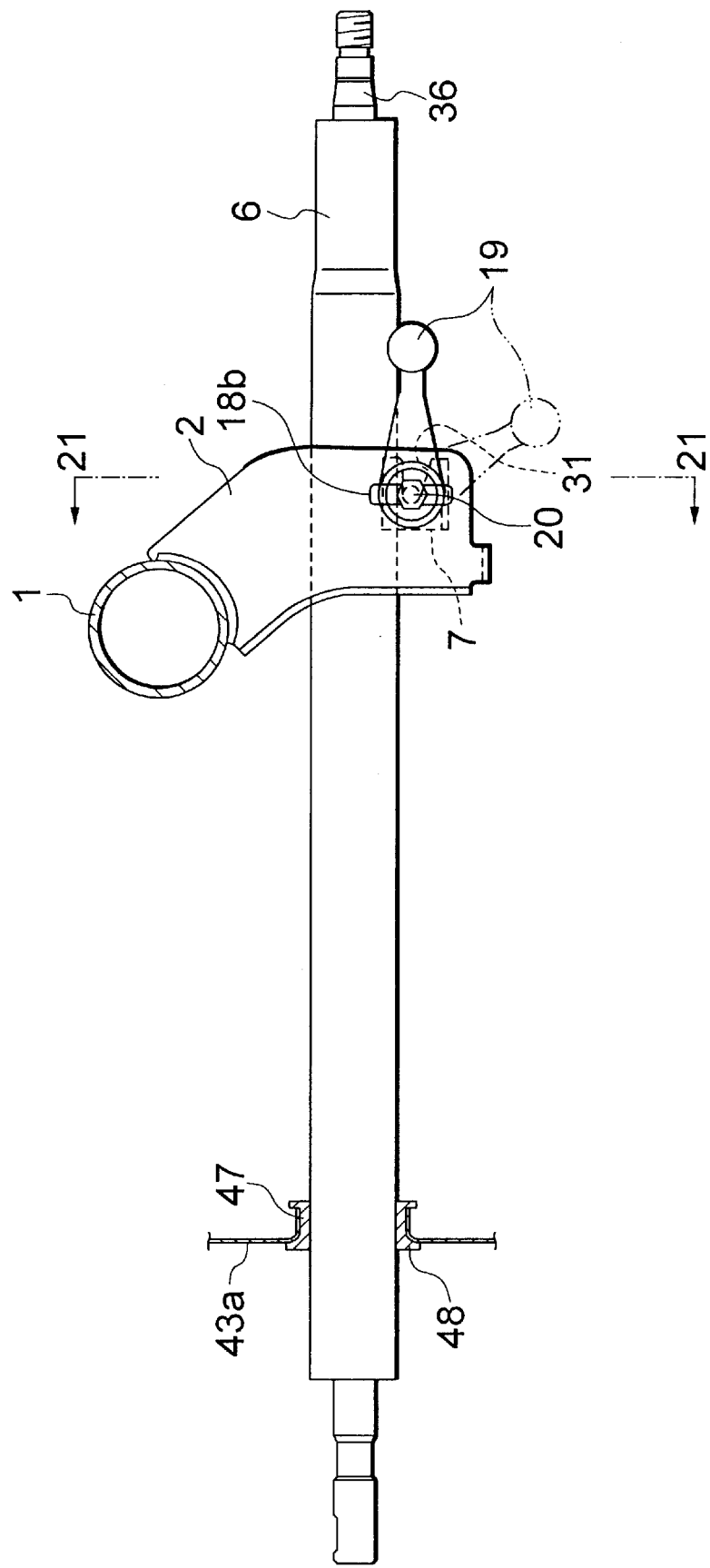
FIG. 20 is a fragmentary vertical sectional side view showing a ninth embodiment of the present invention.
Figure 21:
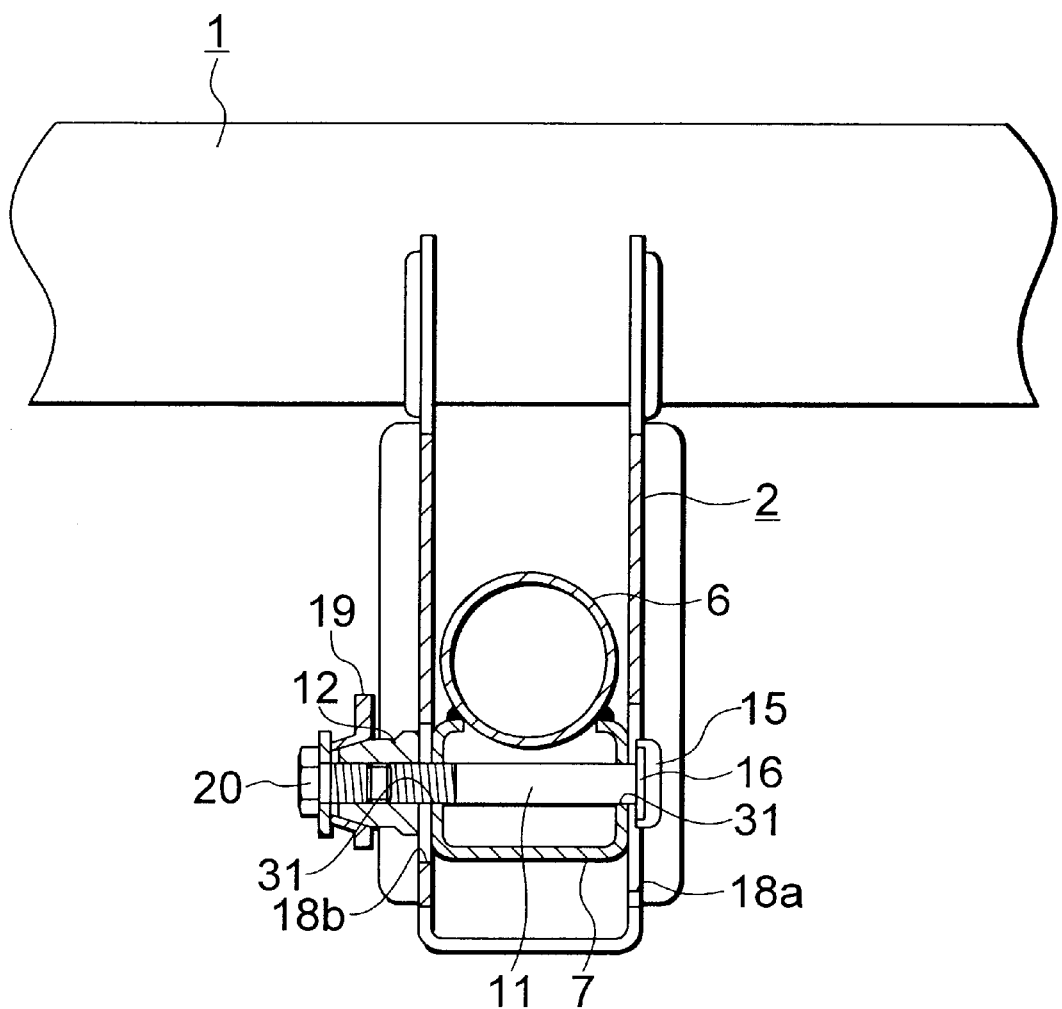
FIG. 21 is a sectional view taken along the line 21—21 in FIG. 20.

Next, FIGS. 20 and 21 illustrate a ninth embodiment of the present invention. A structure in the ninth embodiment is also, as in the eighth embodiment described above, provided with the shock absorbing function of absorbing the impact applied to the body of the driver who has impinged upon the steering wheel when at the secondary collision, and the function of making adjustable the height position of the steering wheel. For attaining these functions, in the ninth example, the front side end of the steering column 6 is supported so as to be shiftable in the axial direction (the right-and-left directions in FIG. 20) as well as being slightly rockable with respect to a lower fixed bracket 43a fixed to the car body. More specifically, a bush 48 composed of an elastic material such as elastomer etc like rubber is engaged inside a cylindrical portion 47 provided at the lower fixed bracket 43a. The front side end of the steering column 6 is press-fitted into the bush 48. In this state, the front side end of the steering column 6 is supported in the rockable manner based on the elastic deformation of the bush 48.

On the other hand, the supported bracket 7 fixed by welding to the intermediate portion of the steering column 6 is, with the same structure as the prior art structure shown in FIGS. 27 and 28, supported in an up-and-down position adjustable manner by the support bracket 2 fixed by welding directly to the cross member 1. Therefore, the support bracket 2 is formed in the U-shape with the upper portion being opened and the lower ends being connected to each other. When assembling the above structure in the ninth example, the steering column 6 is inserted inside the support bracket 2, and thereafter the front side end of the steering column 6 is press-fitted into the bush 48. Subsequently, the supported bracket 7 is connected to the support bracket 2 with the bolt 11 and the nut 12. Other configurations and operations are the same as those in the respective examples discussed above.

Figure 22:
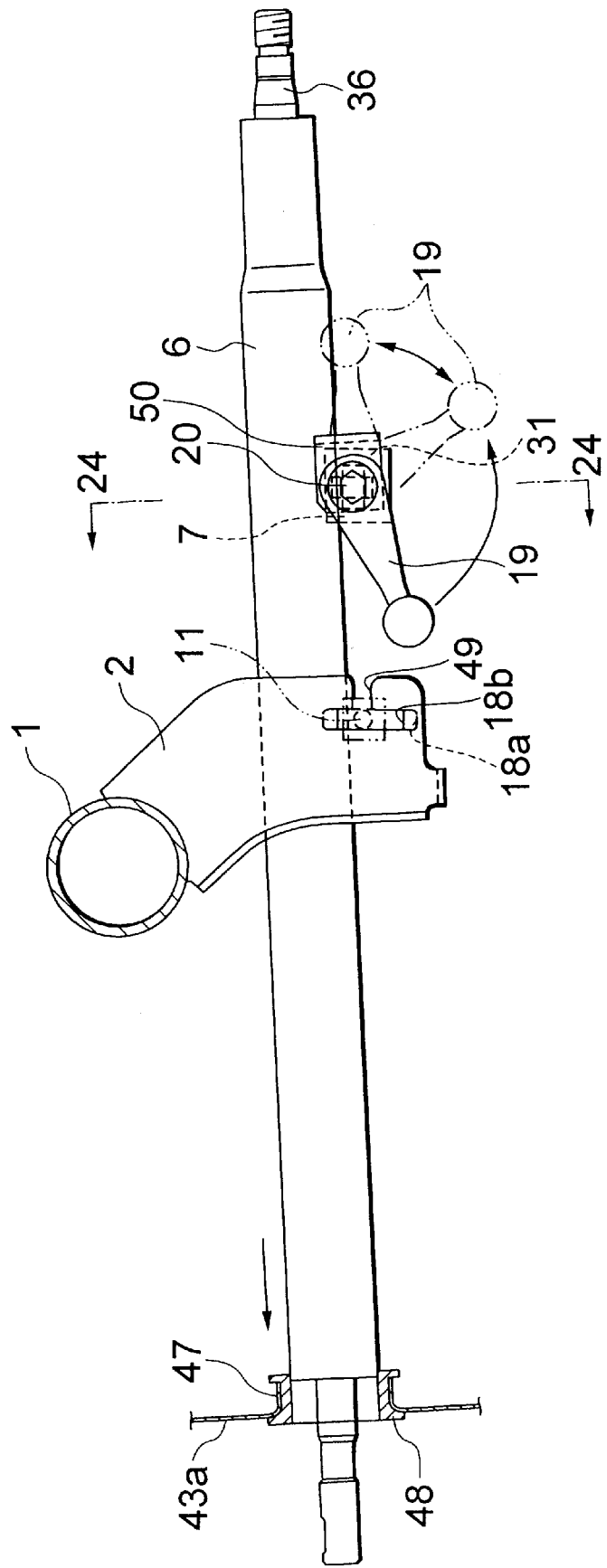
FIG. 22 a fragmentary vertical sectional side view showing a tenth embodiment of the present invention in a midway state of the assembly.
Figure 23:
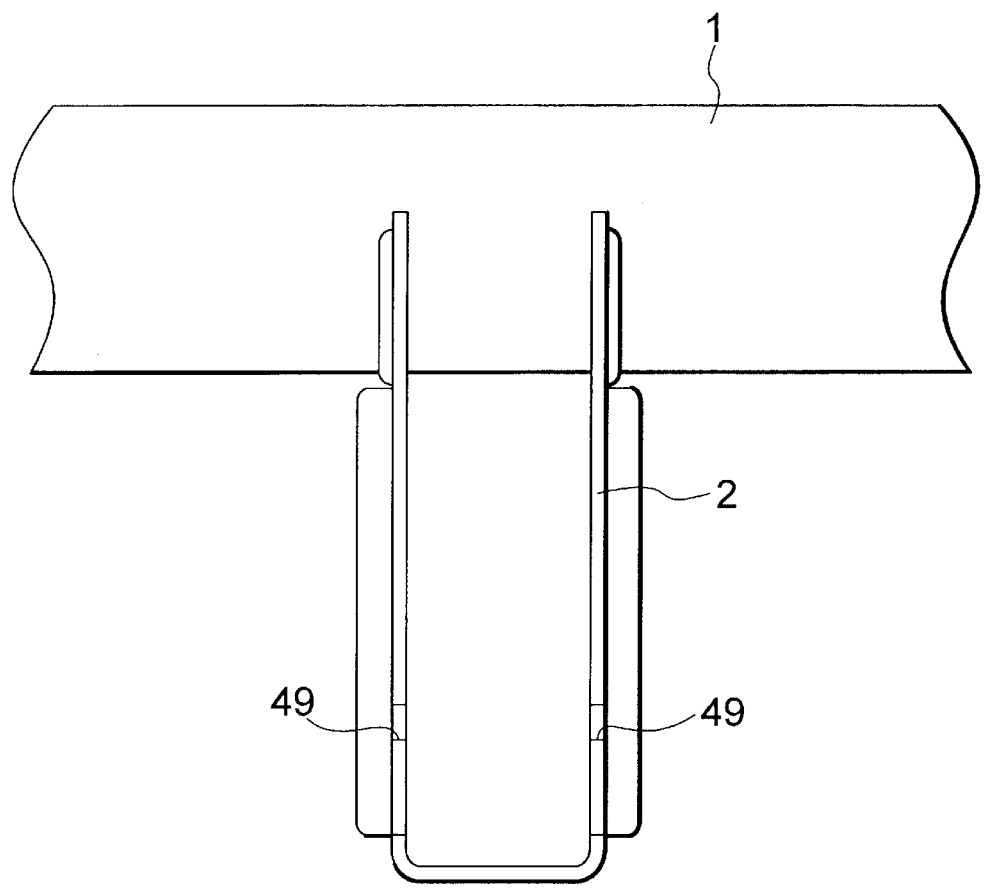
FIG. 23 is a view showing a structure with only a cross member and a support bracket being taken out as viewed from the right side in FIG. 22.
Figure 24:
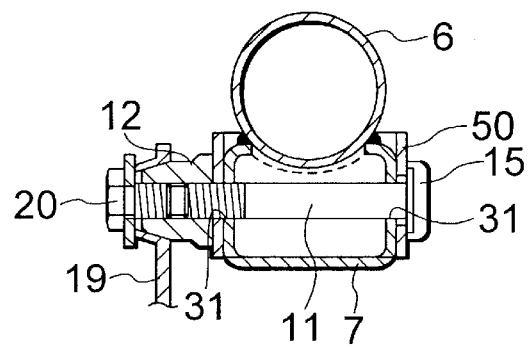
FIG. 24 is a sectional view taken along the line 24—24 in FIG. 22 with some portions being omitted.

Next, FIGS. 22–24 show a tenth embodiment of the present invention. A configuration in the tenth embodiment is that the support bracket 2 is formed with the cut-away portions 49, 49 through which the elongate holes 18a, 18b into which the bolt 11 is loosely fitted communicate with the rear edge of the support bracket 2. These two cut away portions 49, 49 have a width large enough to admit passing of the bolt 11. Accordingly, when assembling the structure in the tenth example, the bolt 11, the nut 12 and further the tilt lever 19 can be previously assembled to the supported bracket 7 in the factory for manufacturing the steering column. Accordingly, the number of processes in the automobile assembly factory can be reduced.

Namely, in the factor for manufacturing the steering column 6, the above-described members, 11, 12, 19 are assembled to the supported bracket 7, and a spacer 50 composed of a synthetic resin or a metal plate etc substantially in the U-shape, is interposed between the bolt 11, the nut 12 and the supported bracket 7. Then, the bolt 11 and the but 12 are fastened. Note that the spacer 50 has a thickness equal to the support bracket 7, and cut away portions through which to insert the bolt 11 are formed in the opposed positions of the two side ends of the spacer 50. In the automobile assembly factory, the bolt 11 and the nut 12 are slackened to remove the spacer 50, and thereafter the front side end of the steering column 6 is press-fitted into the bush 48. At the same time, the bolt 11 is inserted via the two cut-away portions 49, 49 into the elongate holes 18a, 18b. The spacer 50 is sent back to the factory of manufacturing the steering column 6 and reused there. Other configurations and operations are the same as those in the ninth example.

Figure 25:
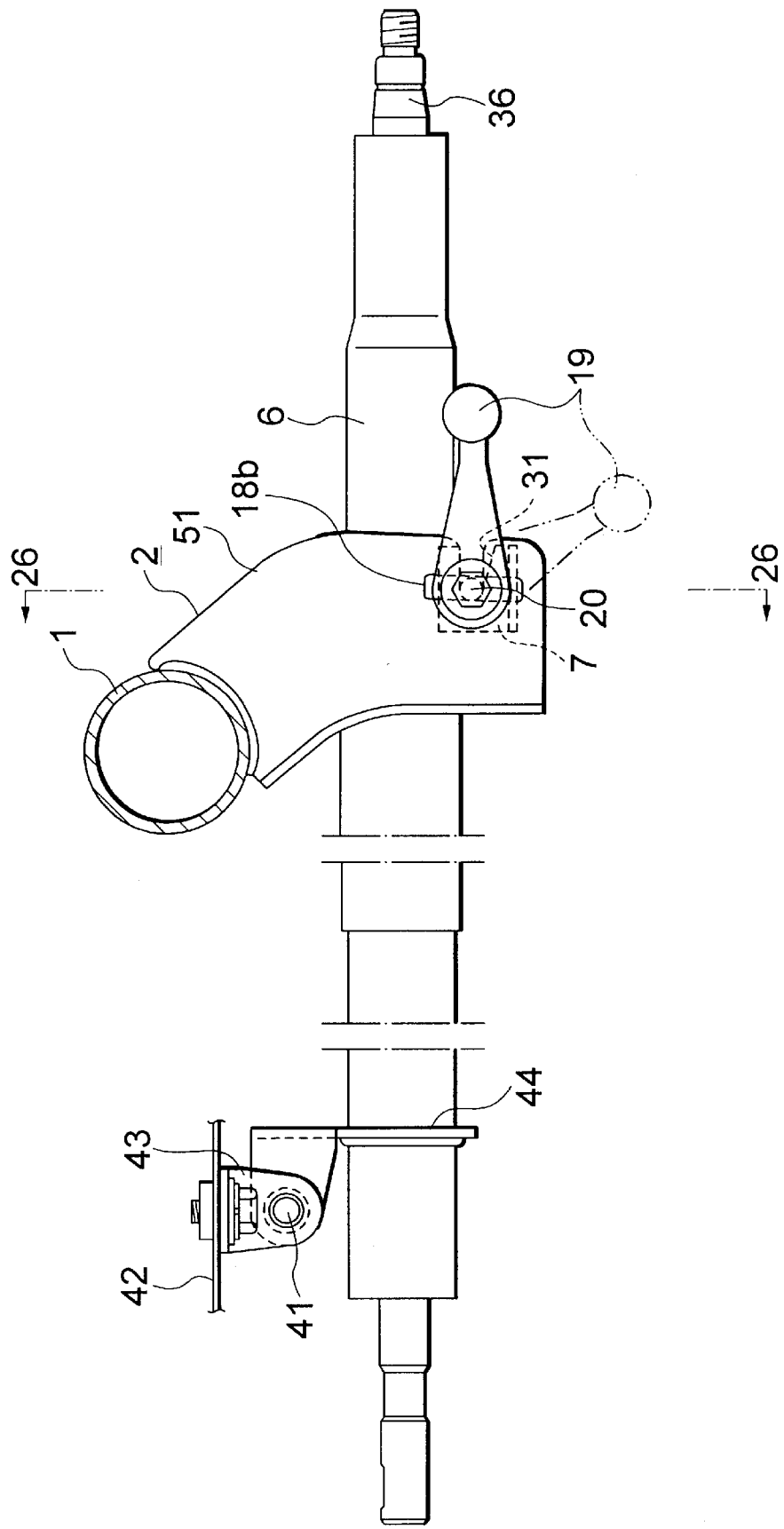
FIG. 25 is a side view showing an eleventh embodiment of the present invention.
Figure 26:
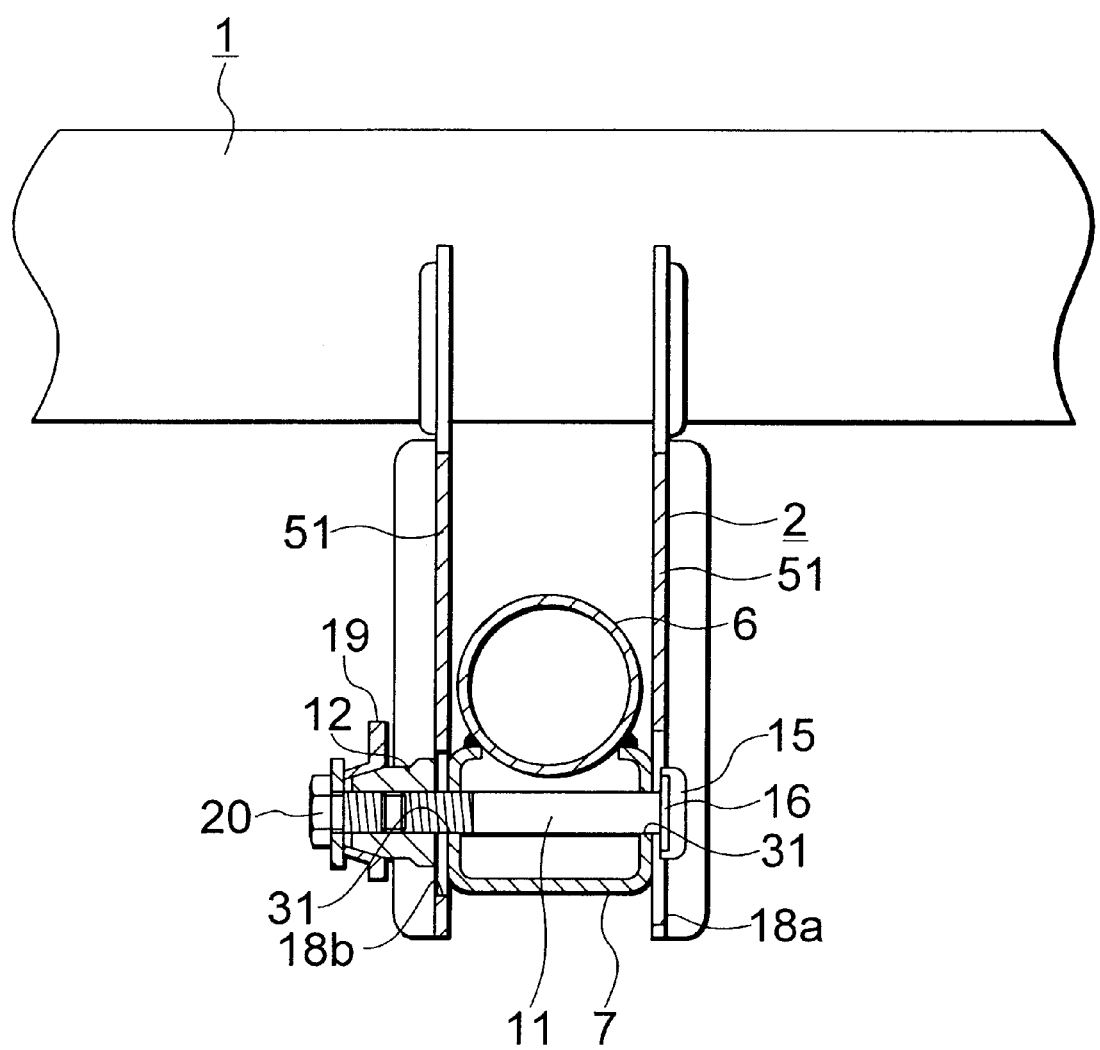
FIG. 26 is a sectional view taken along the line 26—26 in FIG. 25.
Figure 29:
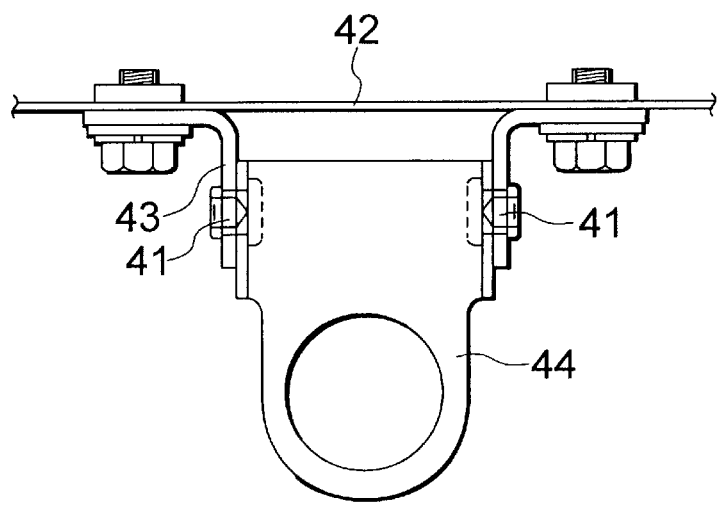
FIG. 29 is a view taken along the arrow H in FIG. 27, illustrating the structure with a steering column and a steering shaft being removed.

Next, FIGS. 25 and 26 show an eleventh embodiment of the present invention. The eleventh embodiment involves the use of a collapsible type steering column 6 of which an entire length is reduced while absorbing the impact energy, and the front side end of the steering column 6 is, as in the case of the prior art structure shown in FIGS. 27–29, supported rockably with a structure including a horizontal shaft 41. Further, with such a structure being taken, a rock bracket 44 is fixed by welding to the front side end of the steering column 6. With this configuration, the support bracket 2 used herein takes a shape with its lower portion being opened, and the intermediate portion of the steering column 6 is insertable from the lower opening into the support bracket 2.

A pair of right-and-left plate members 51, 51 constituting the support bracket 2 may be formed separately, however, it is a free option to integrally connect the plate members 51, 51 in a position upper than the steering column 6 (an upper end position in, e.g., FIG. 26). Other configurations and operations are the same as those in the ninth or tenth example discussed above.

The steering column supporting apparatus of the present invention is constructed and operates as described above, and can be therefore actualized at low costs with the decreases both in size and in weight.

What is claimed is:

1. An apparatus for supporting a steering column, comprising:
   a cross member spanned between right and left walls of a vehicle body at a portion anterior to a driver's seat;
   a unitary support bracket integrally fixedly connected at a recessed portion thereof to an intermediate portion of said cross member received in said recessed portion and substantially aligned with said driver's seat;
   a supported bracket fixedly connected to an intermediate portion of said steering column; and
   a connecting member for connecting said support bracket and said supported bracket to each other in an up-and-down position adjustable manner.

2. An apparatus for supporting a steering column according to claim 1, wherein said support bracket includes a pair of right-and-left support plate members parallel to each other and is fixedly connected by welding to said cross member,
   said supported bracket is interposed between said pair of support plate members in a state of being fixed by welding to said steering column,
   said connecting member is a bolt penetrating said pair of support plate members and said supported bracket, and
   said supported bracket is fixedly supported by said pair of support plate members with a nut screwed to the tip of said bolt and with a head of said bolt.

3. An apparatus for supporting a steering column according to claim 2, wherein said supported bracket is supported in an up-and-down position adjustable manner by said support bracket, and the front side end of said steering column is supported rockably by a rock support member provided at a front side end of said support bracket.

4. An apparatus for supporting a steering column according to claim 2, wherein said supported bracket is so connected to said support bracket as to be shiftable forward when a strong load acting forward is applied to said steering column, the front side end of said steering column is supported by a shock absorbing member provided at the front side end of said support bracket, and said shock absorbing member, when the strong load is applied thereto, permits said steering column to shift forward while being plastically deformed.

5. An apparatus according to claim 2, wherein said right and left support plate members are substantially planar.

6. An apparatus according to claim 1, wherein said recessed portion of said support bracket and said intermediate portion of said cross member are shaped so as to substantially mate with each other.

7. An apparatus according to claim 6, wherein said cross member is cylindrical and said recessed portion of said support bracket is arcuate.

8. An apparatus according to claim 1, wherein said supported bracket includes a pair of right and left supported plate portions held in contact with inner surfaces of said right and left support plate members, respectively, and a joining portion joining said right and left supported plate portions.

9. An apparatus according to claim 1, further comprising a fixed bracket attached to said vehicle body above a front side end of said steering column and a deformable elastomeric member received in a cylindrical portion of said fixed bracket and rockably supporting said steering column.

10. An apparatus according to claim 1, further comprising a fixed bracket attached to said vehicle body above a front side end of said steering column, and a rockable bracket pivotally connected to said fixed bracket and rockably supporting said steering column.

11. An apparatus for supporting a steering column, comprising:

a cross member spanned between right and left walls of a vehicle body;

a unitary support bracket fixed at a recessed portion thereof to an intermediate portion of said cross member received in said recessed portion and substantially aligned with a driver's seat, said support bracket having a pair of support plate members opposed to each other;

a supported bracket fixed to an intermediate portion of said steering column, and having a pair of opposed supported plate members coupled to said opposed support plate members of said support bracket; and a connecting member for connecting a coupled portion between said support bracket and said supported bracket by fastening said connecting member, wherein said supported bracket is supported in a height-position adjustable manner by said support bracket.

12. An apparatus for supporting a steering column according to claim 11, wherein said support bracket is formed with an elongate groove for adjusting a height, and said supported bracket is fastened and connected through said elongate groove to a desired position of said support bracket by said connecting member.

13. An apparatus for supporting a steering column according to claim 11, wherein said supported bracket is formed with an elongate groove for adjusting a height, and fastened and connected through said elongate groove to a desired position of said support bracket by said connecting member.

14. An apparatus for supporting a steering column according to claim 11, wherein the front side end of said steering column is supported rockably to the front side end of said support bracket.

15. An apparatus for supporting a steering column according to claim 11, wherein said supported bracket is so connected as to be shiftable forward of the vehicle from said support bracket when an impact load acting forward of said column and exceeding a predetermined value is applied to said supported bracket.

16. An apparatus for supporting a steering column according to claim 15, wherein said supported bracket is formed at said coupled portion with an open groove opened toward the rear of the vehicle, and said connecting member fastens and connects said supported bracket to said support bracket through the open groove so as to be separable when the load exceeding the predetermined value is applied.

17. An apparatus for supporting a steering column according to claim 16, wherein a folded portion taking a U-shape opened backward is integrally formed at the front side end of said support bracket, said steering column is supported rockably at the front side end thereof through a pin engaging with said folded portion, and said folded portion is drawn by said pin when the impact load exceeding the predetermined value acts on said steering column.

18. An apparatus according to claim 11, wherein said recessed portion of said support bracket and said intermediate portion of said cross member are shaped so as to substantially mate with each other.

19. An apparatus according to claim 18, wherein said cross member is cylindrical and said recessed portion of said support bracket is arcuate.

20. An apparatus for supporting a steering column, comprising:

a cross member spanned between right and left walls of a vehicle body;

a support bracket including a pair of substantially parallel support plate members having respective recessed portions in which an intermediate portion of said cross member is received and fixedly joined to said support plate members;

a supported bracket fixed to an intermediate portion of said steering column and having a pair of supported plate portions juxtaposed, respectively, to said pair of support plate members; and a connecting device which holds each supported plate portion in frictional engagement with the juxtaposed support plate member to secure said supported bracket to said support bracket.

21. An apparatus according to claim 20, wherein said recessed portions of said support plate members and said intermediate portion of said cross member are shaped so as to substantially mate with each other.

22. An apparatus according to claim 21, wherein said intermediate portion of said cross member is cylindrical and said recessed portions of said support plate members are arcuate.

23. An apparatus according to claim 20, wherein said support plate members are substantially planar.

24. An apparatus according to claim 20, wherein said support bracket is unitary.

* * * * *